(12) United States Patent
Kim et al.

(10) Patent No.: US 10,015,400 B2
(45) Date of Patent: Jul. 3, 2018

(54) MOBILE TERMINAL FOR CAPTURING AN IMAGE AND ASSOCIATED IMAGE CAPTURING METHOD

(71) Applicant: LG ELECTRONICS INC., Seoul (KR)

(72) Inventors: Byoungeul Kim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/231,363

(22) Filed: Aug. 8, 2016

(65) Prior Publication Data

US 2017/0180646 A1    Jun. 22, 2017

(30) Foreign Application Priority Data

Dec. 17, 2015    (KR) ........................ 10-2015-0181237

(51) Int. Cl.
*H04N 5/232*    (2006.01)

(52) U.S. Cl.
CPC ..... *H04N 5/23267* (2013.01); *H04N 5/23219* (2013.01); *H04N 5/23222* (2013.01); *H04N 5/23245* (2013.01); *H04N 5/23254* (2013.01); *H04N 5/23258* (2013.01); *H04N 5/23293* (2013.01)

(58) Field of Classification Search
CPC ........................ H04N 5/23267; H04N 5/23219
See application file for complete search history.

(56) References Cited

U.S. PATENT DOCUMENTS 8,068,639 B2 *   11/2011   Ishiwata ............ G06K 9/00228
                                                     382/103
8,194,140 B2 *   6/2012   Suzuki .................. G03B 13/36
                                                     348/208.16

(Continued)

FOREIGN PATENT DOCUMENTS

EP          2753064           7/2014
KR    10-2010-0123490        11/2010

(Continued)

OTHER PUBLICATIONS

Korean Intellectual Property Office Application Serial No. 10-2015-0181237, Office Action dated Nov. 18, 2016, 9 pages.

(Continued)

*Primary Examiner* — Cynthia Segura
(74) *Attorney, Agent, or Firm* — Lee, Hong, Degerman, Kang & Waimey PC

(57) ABSTRACT

Disclosed are a mobile terminal, and a method for controlling the same. The mobile terminal includes: a body; a camera provided at the body; a display unit configured to display a preview screen as the camera is driven; a sensing unit configured to sense a moved degree of the body as the camera is driven; and a controller configured to control the camera to execute a timer capturing, if a face region of a subject is detected from the displayed preview screen, and if the sensed moved degree of the body satisfies a preset capturing condition. The controller may execute an operation corresponding to the timer capturing, and may consecutively generate a next capturing command at a reference time interval while the moved degree of the body is within a reference range.

18 Claims, 19 Drawing Sheets

(56) References Cited

U.S. PATENT DOCUMENTS

| | | | | |
|---|---|---|---|---|
| 8,576,320 B2* | 11/2013 | Lim | | H04N 5/23293 |
| | | | | 348/333.02 |
| 9,106,821 B1* | 8/2015 | Baldwin | | H04N 5/23219 |
| 9,148,569 B2* | 9/2015 | Resende | | H04N 5/23258 |
| 9,325,903 B2* | 4/2016 | Kim | | H04N 5/23293 |
| 9,398,251 B2* | 7/2016 | Choi | | H04N 7/147 |
| 9,658,452 B2* | 5/2017 | Lim | | G02B 27/017 |
| 2003/0071908 A1* | 4/2003 | Sannoh | | H04N 5/23212 |
| | | | | 348/345 |
| 2006/0197845 A1* | 9/2006 | Masaki | | G06T 7/20 |
| | | | | 348/224.1 |
| 2007/0030375 A1* | 2/2007 | Ogasawara | | G06K 9/00228 |
| | | | | 348/333.11 |
| 2007/0237513 A1* | 10/2007 | Sugimoto | | G03B 7/26 |
| | | | | 396/123 |
| 2007/0266312 A1* | 11/2007 | Ayaki | | G06K 9/228 |
| | | | | 715/273 |
| 2008/0273097 A1* | 11/2008 | Nagashima | | G06K 9/3241 |
| | | | | 348/231.99 |
| 2009/0079844 A1* | 3/2009 | Suzuki | | G03B 13/36 |
| | | | | 348/222.1 |
| 2009/0087039 A1* | 4/2009 | Matsuura | | H04N 5/232 |
| | | | | 382/118 |
| 2010/0061636 A1* | 3/2010 | Fukushima | | G06K 9/00261 |
| | | | | 382/190 |
| 2011/0063118 A1 | 3/2011 | Sato et al. | | |
| 2011/0170740 A1* | 7/2011 | Coleman | | G06K 9/036 |
| | | | | 382/103 |
| 2012/0262592 A1* | 10/2012 | Rabii | | H04N 5/23241 |
| | | | | 348/208.16 |
| 2013/0120602 A1* | 5/2013 | Huang | | H04M 1/72522 |
| | | | | 348/218.1 |
| 2013/0235224 A1* | 9/2013 | Park | | H04N 5/23222 |
| | | | | 348/218.1 |
| 2013/0314511 A1* | 11/2013 | Chen | | H04N 5/23222 |
| | | | | 348/50 |
| 2014/0232906 A1* | 8/2014 | Ha | | H04N 5/265 |
| | | | | 348/239 |
| 2014/0232921 A1* | 8/2014 | Kim | | H04N 5/2258 |
| | | | | 348/333.05 |
| 2014/0362257 A1* | 12/2014 | Viljamaa | | H04N 5/2251 |
| | | | | 348/231.99 |
| 2015/0049234 A1* | 2/2015 | Jung | | H04N 5/2258 |
| | | | | 348/333.05 |
| 2015/0139659 A1* | 5/2015 | Oshima | | H04B 10/116 |
| | | | | 398/118 |
| 2015/0237268 A1* | 8/2015 | Vaiaoga | | H04N 5/247 |
| | | | | 348/218.1 |
| 2015/0350551 A1* | 12/2015 | Harris | | H04N 5/23216 |
| | | | | 348/231.99 |
| 2016/0165002 A1* | 6/2016 | LeBeau | | H04L 67/306 |
| | | | | 709/204 |
| 2016/0170542 A1* | 6/2016 | Park | | G06F 3/0488 |
| | | | | 345/173 |
| 2016/0253560 A1* | 9/2016 | Tokutake | | G06F 3/0412 |
| | | | | 382/103 |
| 2016/0373437 A1* | 12/2016 | He | | G06F 21/32 |
| 2016/0373647 A1* | 12/2016 | Garcia Morate | .. | H04N 5/23222 |

FOREIGN PATENT DOCUMENTS

| | | |
|---|---|---|
| KR | 10-2011-0035563 | 4/2011 |
| KR | 10-2015-0072922 | 6/2015 |
| KR | 101537624 | 7/2015 |
| WO | 2009053863 | 4/2009 |

OTHER PUBLICATIONS

European Patent Office Application Serial No. 16198022.2, Search Report dated May 12, 2017, 11 pages.

* cited by examiner

FIG. 2D
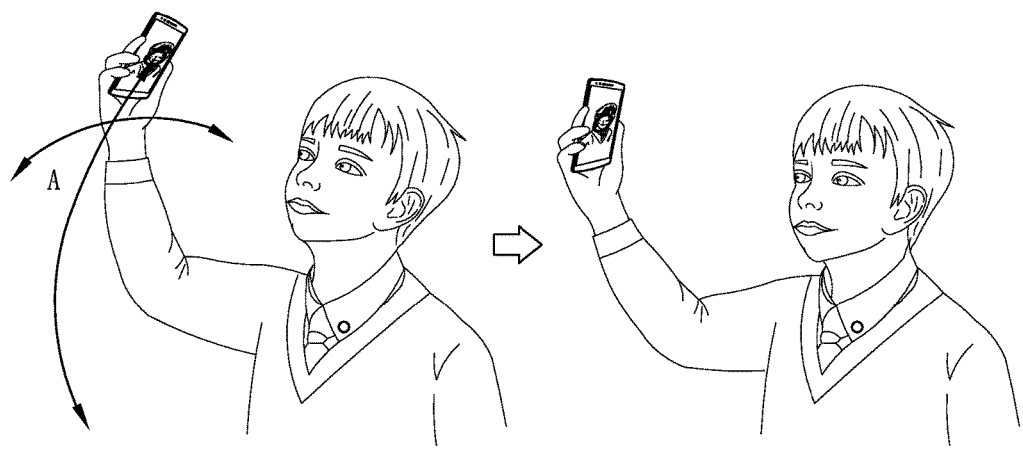
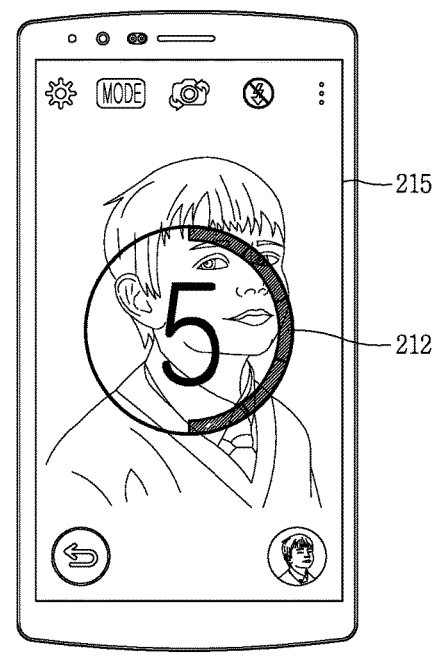

FIG. 9A
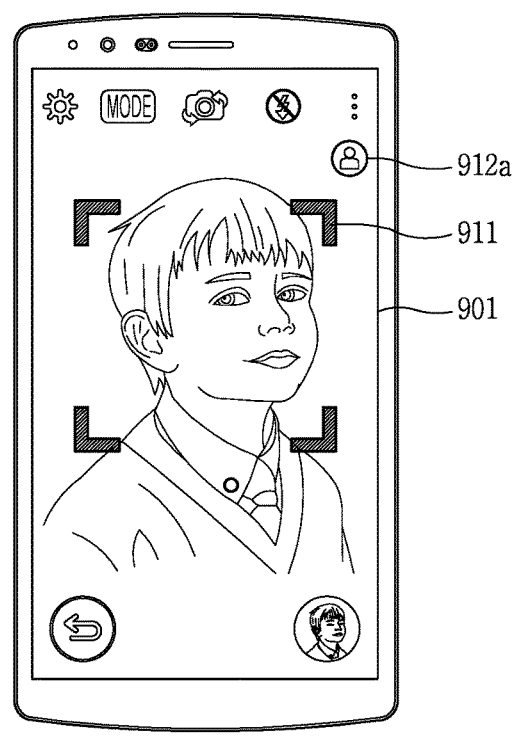
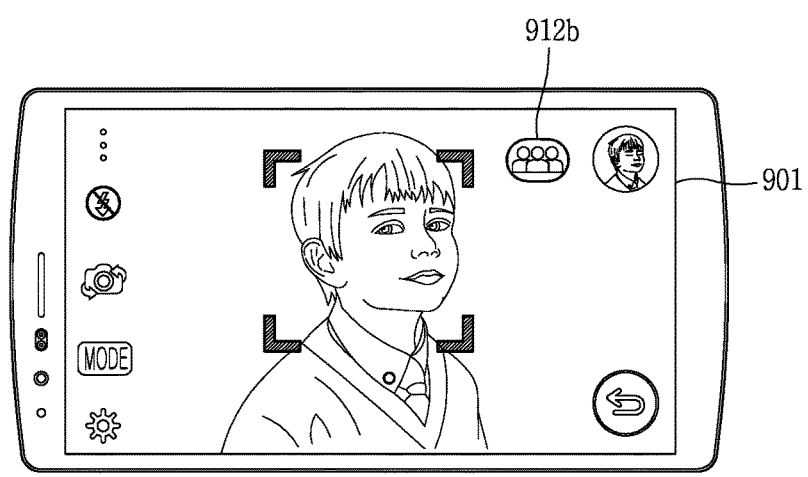

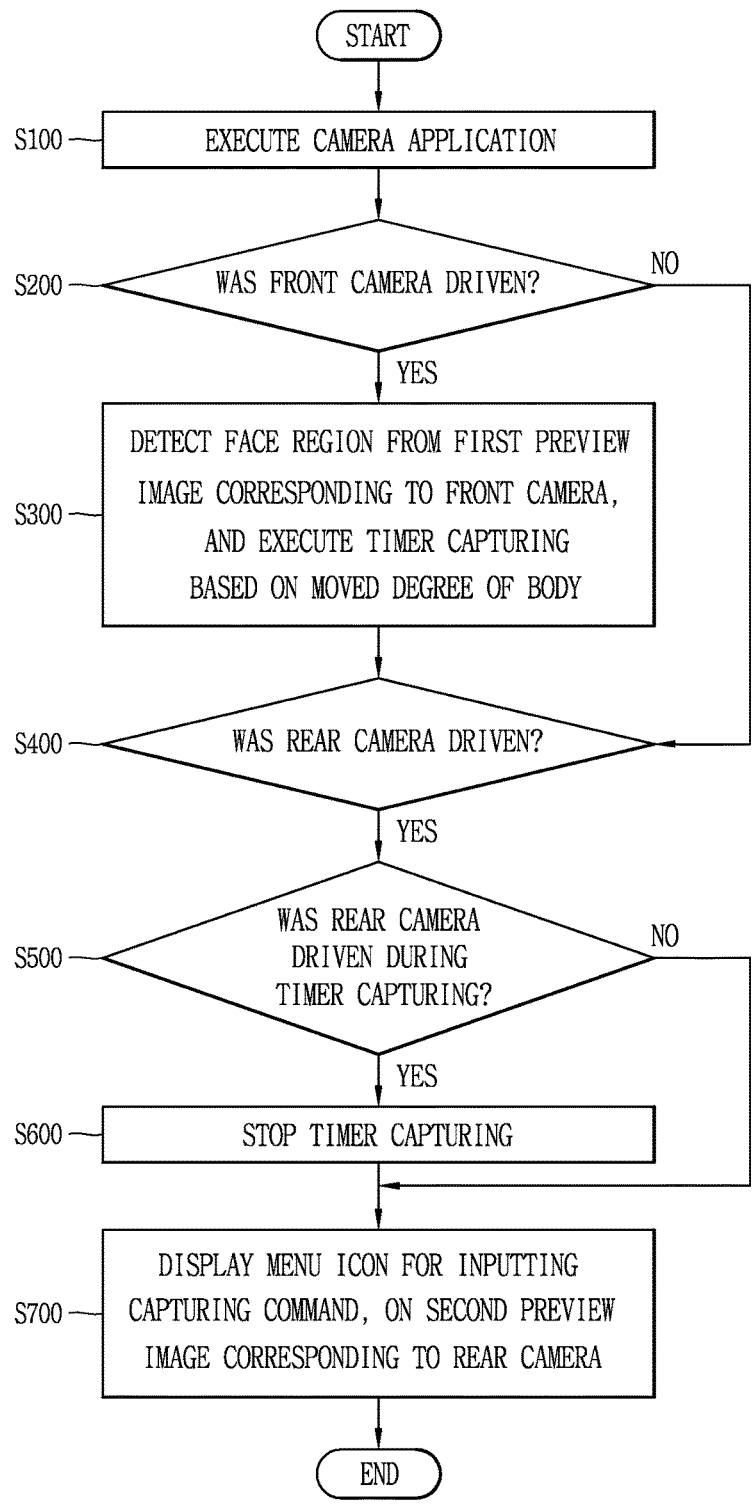

FIG. 12
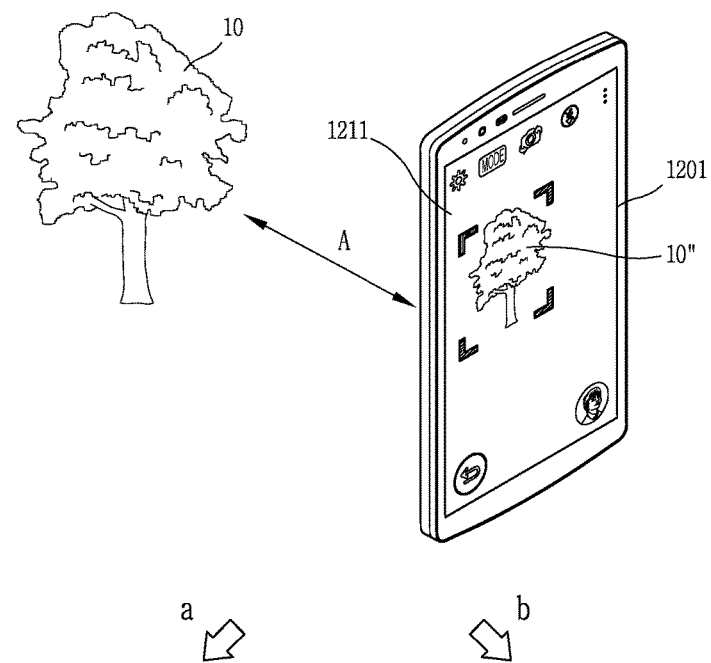
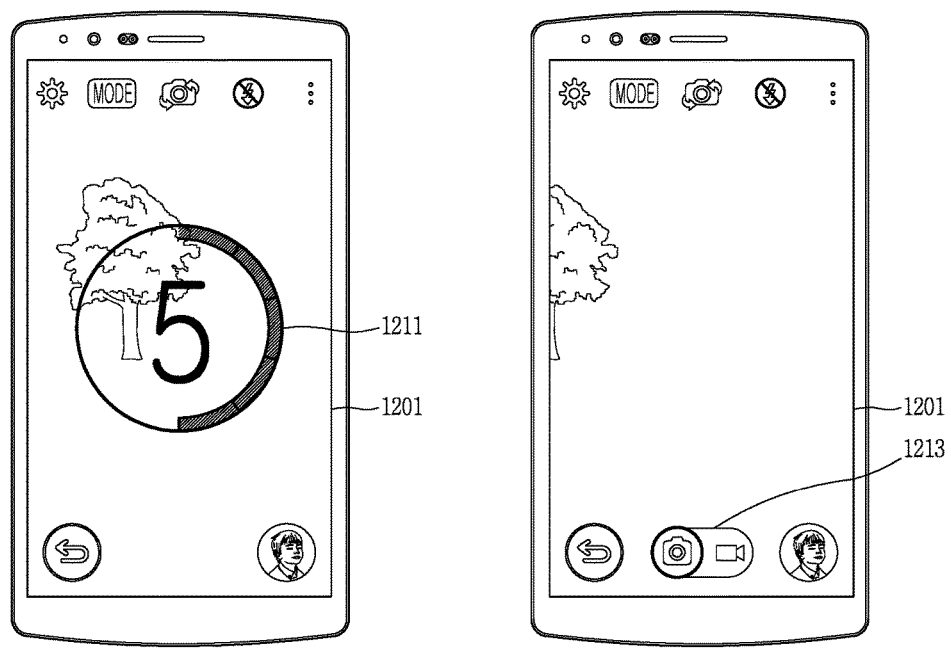

MOBILE TERMINAL FOR CAPTURING AN IMAGE AND ASSOCIATED IMAGE CAPTURING METHOD

CROSS-REFERENCE TO RELATED APPLICATION

Pursuant to 35 U.S.C. § 119(a), this application claims the benefit of earlier filing date and right of priority to Korean Application No. 10-2015-0181237, filed on Dec. 17, 2015, the contents of which is incorporated by reference herein in its entirety.

BACKGROUND OF THE INVENTION

1. Field of the Invention

The present invention relates to a mobile terminal, and more particularly, to a mobile terminal having a camera capable of capturing a subject, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

Efforts are ongoing to support and increase the functionality of mobile terminals. Such efforts include software and hardware improvements, as well as changes and improvements in the structural components.

As it becomes multifunctional, a mobile terminal can be allowed to capture still images or moving images, play music or video files, play games, receive broadcast and the like, so as to be implemented as an integrated multimedia player.

The mobile terminal may be provided with one or more cameras to capture an image. For image capturing, a user should press a camera shutter. However, in this case, a capturing image or a capturing composition may have a motion when the camera shutter is pressed in a gripped state of the mobile terminal.

In order to solve such a problem, has been developed a technique of capturing an image when a user utters a specific keyword without pressing a camera shutter. However, in this case, other party may hear the specific keyword. Further, there has been a technique of capturing an image through a specific gesture input. However, in this case, a capturing composition may be changed for such a specific gesture input, and the gesture may not be recognized precisely. Further, there has been a technique of executing capturing using information such as face recognition from an image. However, in case of determining a capturing time point based on video data, a user may have a difficulty in recognizing the capturing time point and accuracy thereof may be degraded.

SUMMARY OF THE INVENTION

Accordingly, an object of the present invention is to address the above-noted and other problems.

Therefore, an aspect of the detailed description is to provide a mobile terminal capable of capturing an image by precisely determining a capturing time point based on a user's capturing intention without an additional input, and a method for controlling the same.

To achieve these and other advantages and in accordance with the purpose of this specification, as embodied and broadly described herein, there is provided a mobile terminal, including: a body; a first camera configured to capture images; a display configured to display a preview screen captured by the first camera; a sensor configured to sense movement of the body; and a controller configured to: execute a timed image capture operation when a first face is detected in the preview screen and a degree of movement sensed via the sensor satisfies a preset capturing condition; and execute a consecutive image capturing operation at a reference time interval while movement of the body is within a reference range after an image is captured via the timed image capture operation.

To achieve these and other advantages and in accordance with the purpose of this specification, as embodied and broadly described herein, there is also provided a mobile terminal, including: a body; a front camera disposed on a front side of the body; a rear camera disposed on a rear side of the body; a display configured to display preview information corresponding to the front camera or the rear camera; and a controller configured to: cause the display to display a first preview screen corresponding to the front camera when the front camera is activated and execute a timed image capturing operation when a degree of movement of the body satisfies a preset capturing condition and a face is detected in the first preview screen; and cause the display to display a second preview screen corresponding to the rear camera when the rear camera is activated, wherein the second preview screen comprises a menu icon for receiving a capturing command.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 2A to 2D are conceptual views illustrating a method of executing a timer capturing at the time of a self capturing, in a mobile terminal according to an embodiment of the present invention;

FIGS. 9A and 9B are views illustrating a method of converting a camera mode into a general angle mode or a wide angle mode during a timer capturing, according to an embodiment of the present invention;

FIGS. 10 and 11 are views illustrating that a timer capturing function is activated or deactivated according to a camera mode, according to an embodiment of the present invention;

FIG. 12 is a conceptual view illustrating a method of executing a timer capturing at the time of an object capturing, according to an embodiment of the present invention.

DETAILED DESCRIPTION OF THE INVENTION

Figure 1A:
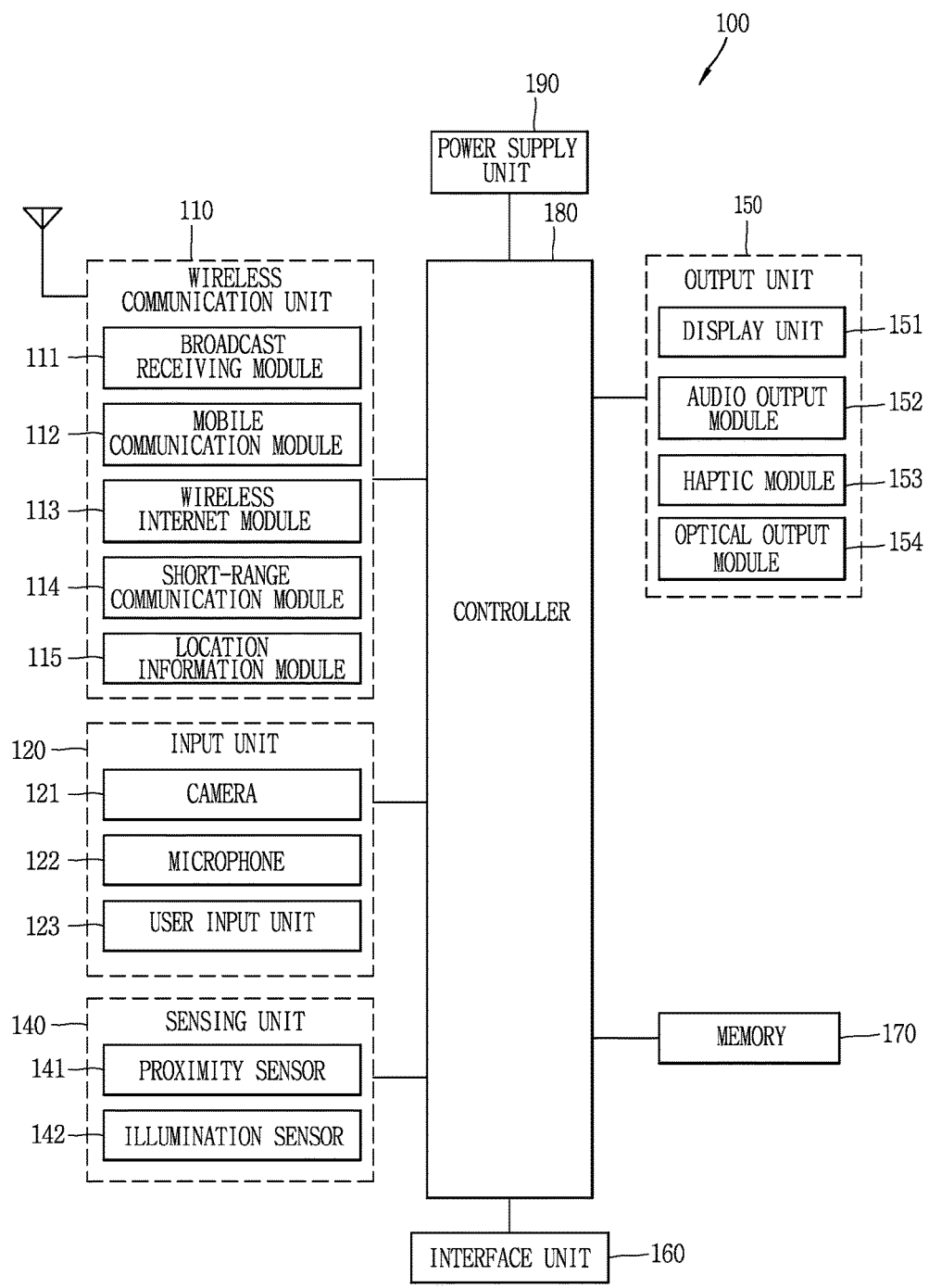
FIG. 1A is a block diagram of a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
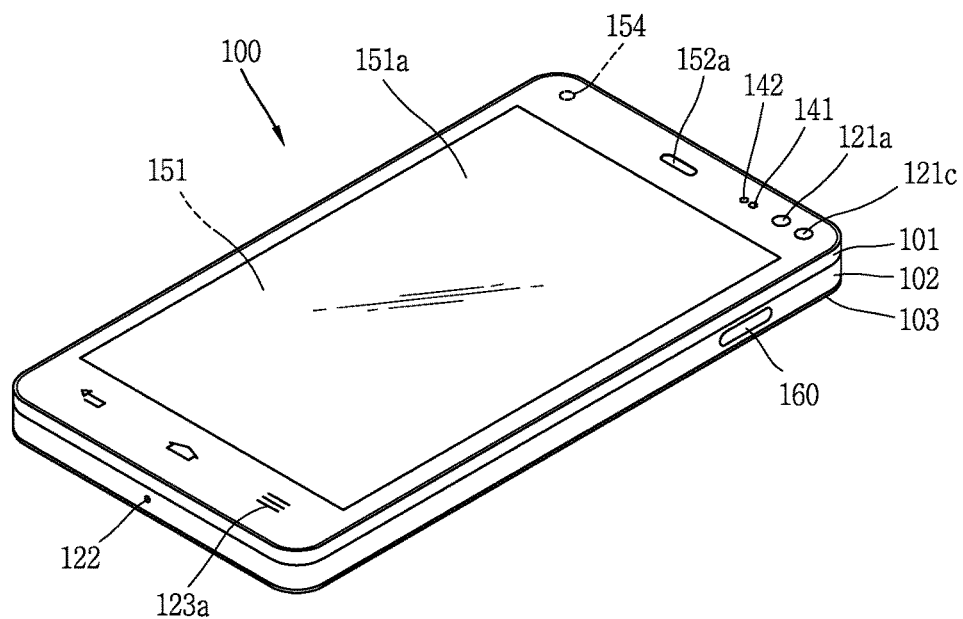
FIGS. 1B and 1C are conceptual views of one example of the mobile terminal according to the present invention, which are viewed from different directions.
Figure 1C:
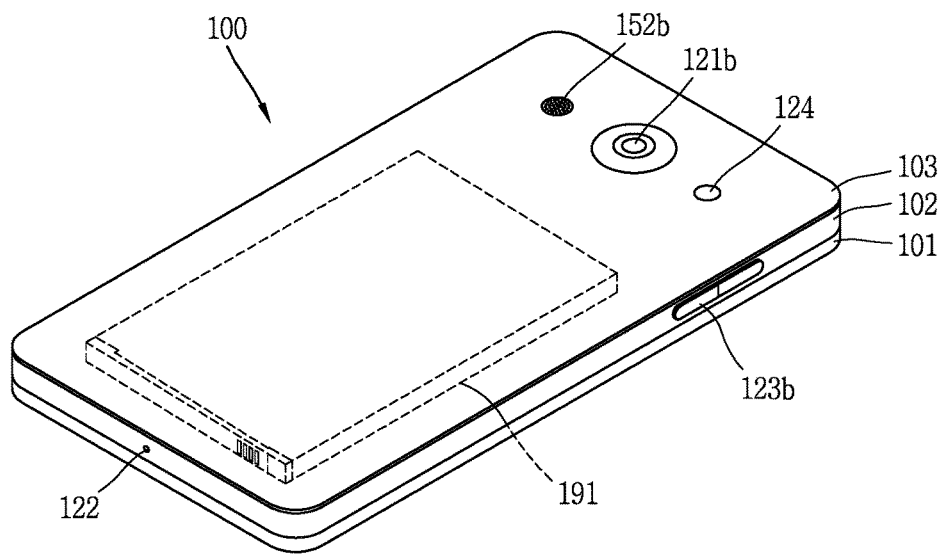

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the mobile terminal 100 which may include at least one of the aforementioned components according to an embodiment of the present invention, when a preview screen is displayed on the display unit 151 as the camera provided on the front surface of the body is driven, the sensing unit 140 for sensing a moved degree of the body, e.g., an acceleration sensor and/or a gyro sensor may be activated.

If a face region of a subject is detected from the preview screen, and if a moved degree sensed by the sensing unit 160 satisfies a preset capturing condition, the controller 180 of the mobile terminal 100 may execute a timer capturing by determining it as a capturing time point. Then, the controller 180 executes a consecutive capturing by generating a next capturing signal at a reference time interval, while the moved degree of the body is within a preset range. In the present invention, the mobile terminal may execute a timer capturing and a consecutive capturing by autonomously determining a capturing time point without directly inputting a capturing signal thereto.

Hereinafter, a method of executing a timer capturing for a self capturing in a mobile terminal according to the present invention will be explained in more detail with reference to FIGS. 2A to 2D.

Figure 2A:
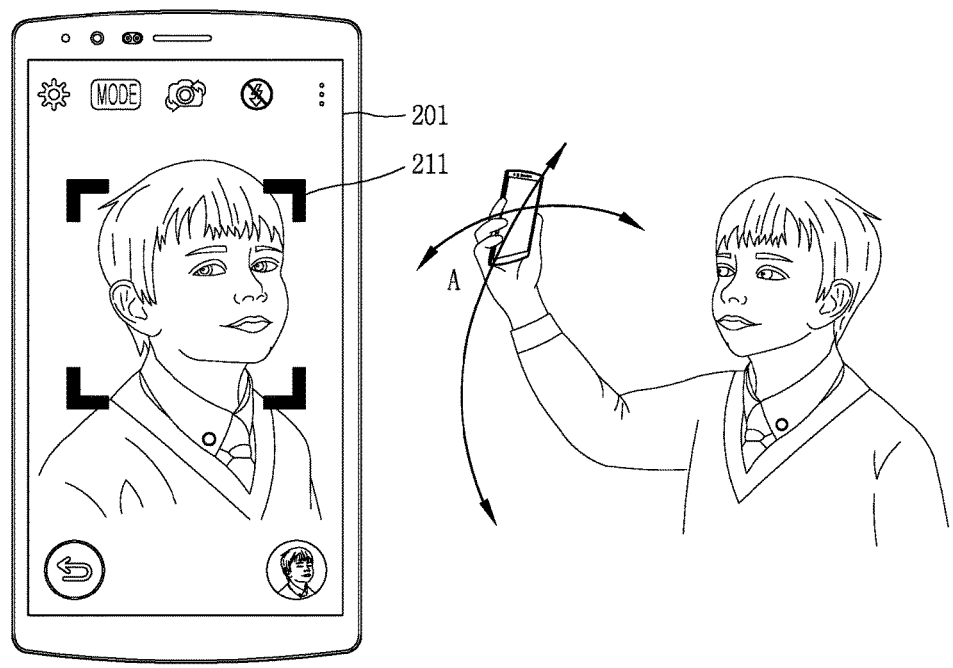

Firstly, once a camera application installed on the mobile terminal 100 is executed, a preview screen 201 for a self capturing may be output to the display unit 151 as shown in FIG. 2A.

In this case, the controller 180 of the mobile terminal 100 may detect a face region of a subject from the preview screen 201, and a corresponding object 211 may be displayed at the periphery of the detected face region. The detection of the face region of the subject may be executed through a face recognition algorithm pre-stored in the mobile terminal 100.

Once the preview screen 201 is output, sensors for sensing a moved degree of the body of the mobile terminal 100, e.g., the acceleration sensor and/or the gyro sensor of the mobile terminal 100 may be activated. As a result, as shown in FIG. 2A, whether the mobile terminal 100 has moved or not and an angle change (A) of the mobile terminal 100 may be sensed.

The gyro sensor may sense a movement of the mobile terminal 100 in space based on X, Y and Z axes, and the acceleration sensor may sense a moving speed, etc. when the mobile terminal 100 is moved in space. The controller 180 may determine whether the mobile terminal 100 has moved in space or not, and an angle change amount of the mobile terminal 100, based on the detected sensing values.

Next, the controller 180 may determine whether the sensed moved degree of the mobile terminal 100 satisfies a preset capturing condition.

The preset capturing condition means a time point when a user has made a capturing composition or a capturing pose for a self capturing, which may mean that a movement of the mobile terminal 100 has not been detected for a predetermined time. The context that a movement of the mobile terminal 100 has not been detected includes not only a case where the mobile terminal 100 has not moved at all, but also a case where a small movement of the mobile terminal due to a trembling hand, etc. has been sensed.

A case where a moved degree of the mobile terminal 100 satisfies a preset capturing condition, indicates that a user has made a capturing composition or a capturing pose, which means that the user has a capturing intention. In this case, in order to more precisely determine the user's capturing intention, the controller 180 may ignore a very small movement of the mobile terminal 100 due to a trembling hand, etc.

Figure 2B:
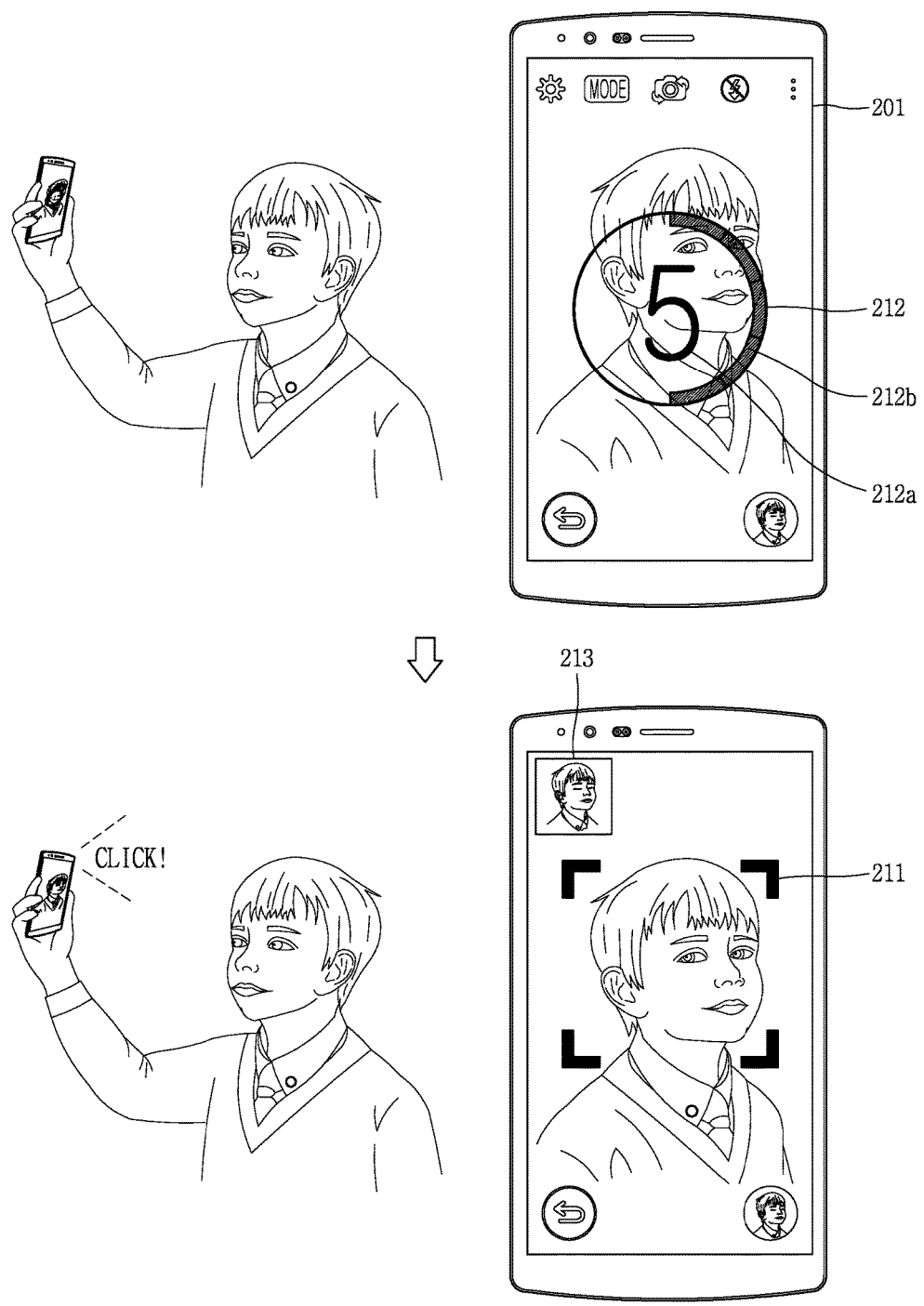

Once a moved degree of the mobile terminal 100 satisfies a preset capturing condition, the controller 180 may execute a timer capturing of the camera 121a. As a result, as shown in FIG. 2B, an image 212 which changes according to a timer driving may be output to the display unit 151. That is, a timer capturing of the camera 121a may be executed as the user fixes the mobile terminal 100 for a predetermined time after making a capturing composition or a capturing pose.

In this case, as shown in FIG. 2B, a number 212a indicating remaining time information, and an object 212b having a variable length may be displayed on the image 212.

Then, if a timer expires, a shutter of the camera 121a is operated to capture the preview screen 201 output to the display unit 151. In this case, a captured image may be displayed on one region of the display unit 151 in the form of a thumbnail. And a preview screen is re-displayed on the display unit 151, and a corresponding object 211 may be displayed at the periphery of a face region detected from the preview screen.

In the present invention, a consecutive capturing may be executed after a timer capturing.

For this, the controller 180 may execute an operation corresponding to the timer capturing, and may generate a next capturing command at a preset interval while a moved degree of the body of the mobile terminal 100 is within a preset range. And the controller 180 may execute a consecutive capturing by transmitting the generated capturing commands to the camera 121a.

Figure 2C:
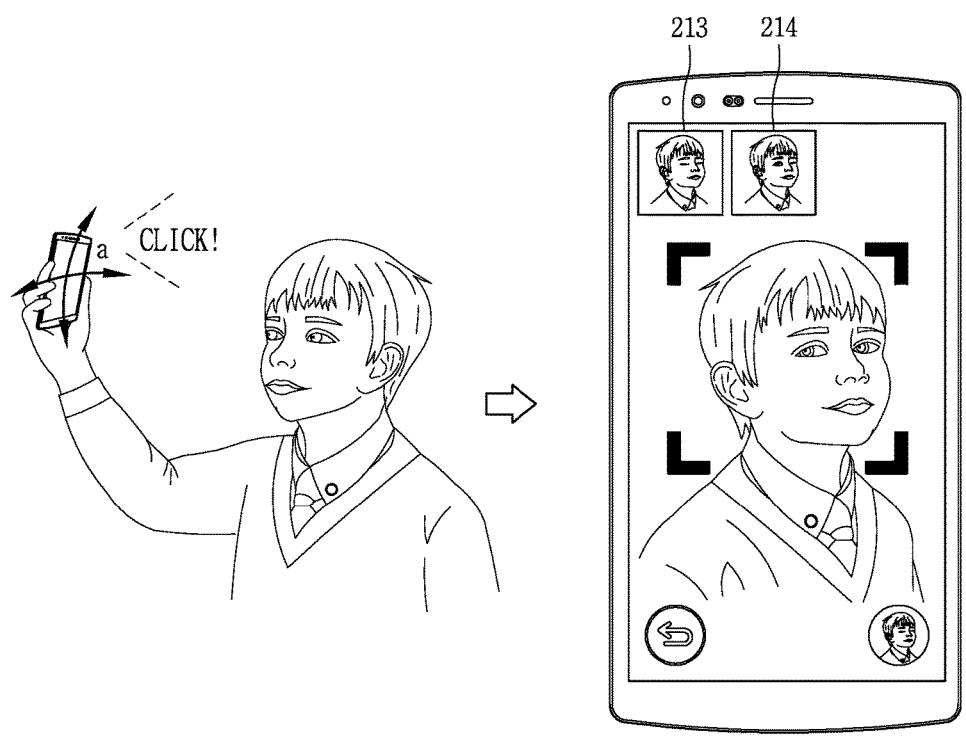

For instance, as shown in FIG. 2C, if a moved degree and an angle change amount of the body of the mobile terminal 100 is within a reference range (a), a next capturing signal is consecutively generated. Thus, as shown in FIG. 2C, thumbnails 213, 214 of consecutively captured images may be displayed on one region of the display unit 151, in order of capturing.

The reference range may correspond to the aforementioned capturing condition (a movement of the body of the mobile terminal 100 has not been sensed), or may mean a range large enough to determine that a moved degree and an angle change amount of the mobile terminal 100 are recognized as a user's consecutive capturing intention.

In another embodiment, a case where a movement of the body within the reference range is not detected may be excluded. That is, even if the body is moved a little, a next capturing command may be generated. In this case, whenever the mobile terminal 100 is moved within a small range, it is determined as a capturing time point, and a consecutive capturing is executed. When the mobile terminal 100 does not move, only a preview screen is output to the display unit 151 such that a capturing standby state is maintained.

If a moved degree of the body does not satisfy a preset capturing condition during a timer capturing, the controller 180 may cancel the timer capturing. More specifically, if a user moves the mobile terminal 100 while a timer is driven during a timer capturing, the timer driving is stopped, and only a preview screen is output to the display unit 151.

If the body is much moved to be out of the reference range while a next capturing command is generated after the timer capturing, the controller 180 may stop the generation of the capturing command and may output only a preview screen to the display unit 151.

For instance, if the mobile terminal 100 is much moved by a user to be out of the reference range (A), it is determined that the user does not wish to execute capturing any longer. Thus, a timer capturing or a consecutive capturing is stopped.

Then, if the mobile terminal 100 is fixed without being moved for a predetermined time, the controller 180 detects a face region of a subject from the preview screen. And the controller 180 determines a time point after the predetermined time as a re-timer capturing time point which satisfies a capturing condition. As a result, as shown in FIG. 2D, the image 212 corresponding to a timer driving is displayed on a preview screen 215.

In the mobile terminal according to the present invention, a user may execute a timer capturing and a consecutive capturing by autonomously determining a capturing time point after making a capturing composition or a capturing pose, without directly inputting a capturing signal through a touch input, a gesture input, a voice utterance, etc.

Hereinafter, an operation of the mobile terminal according to an embodiment of the present invention will be explained in more detail with reference to FIGS. 3 and 4.

Firstly, once the camera provided at the body is driven as a camera application is executed, a preview screen is displayed on the display unit 151 (refer to FIG. 1B) (S10).

Next, a face region of a subject is detected from the preview screen (S20). In this case, the detection of the face region may be restricted to a case where the mobile terminal 100 is in a self capturing mode as the front camera 121a (refer to FIG. 1B) is operated. That is, if the mobile terminal 100 is in a background capturing mode not a self capturing mode as the rear camera 121b (refer to FIG. 1C) is operated, a step of detecting a face region of a subject may be omitted.

Then, it is determined whether a moved degree of the body of the mobile terminal 100 satisfies a preset capturing condition (S30).

A moved degree of the body may be sensed by sensors activated by driving of the camera, e.g., the gyro sensor and the acceleration sensor. And the preset capturing condition may correspond to a case where a movement of the body has not been sensed by the sensors for a reference time.

If a capturing condition is satisfied, a time point when the capturing condition has been satisfied is determined as a capturing time point, and a timer capturing is executed (S40). Accordingly, a timer driving is triggered, and the shutter of the camera is operated when a set time lapses to capture the preview screen.

Then, while the mobile terminal 100 is moved within the reference time, capturing commands are consecutively generated at reference time intervals to be provided to the camera (S50). Accordingly, a consecutive capturing may be executed without a timer.

Figure 4:
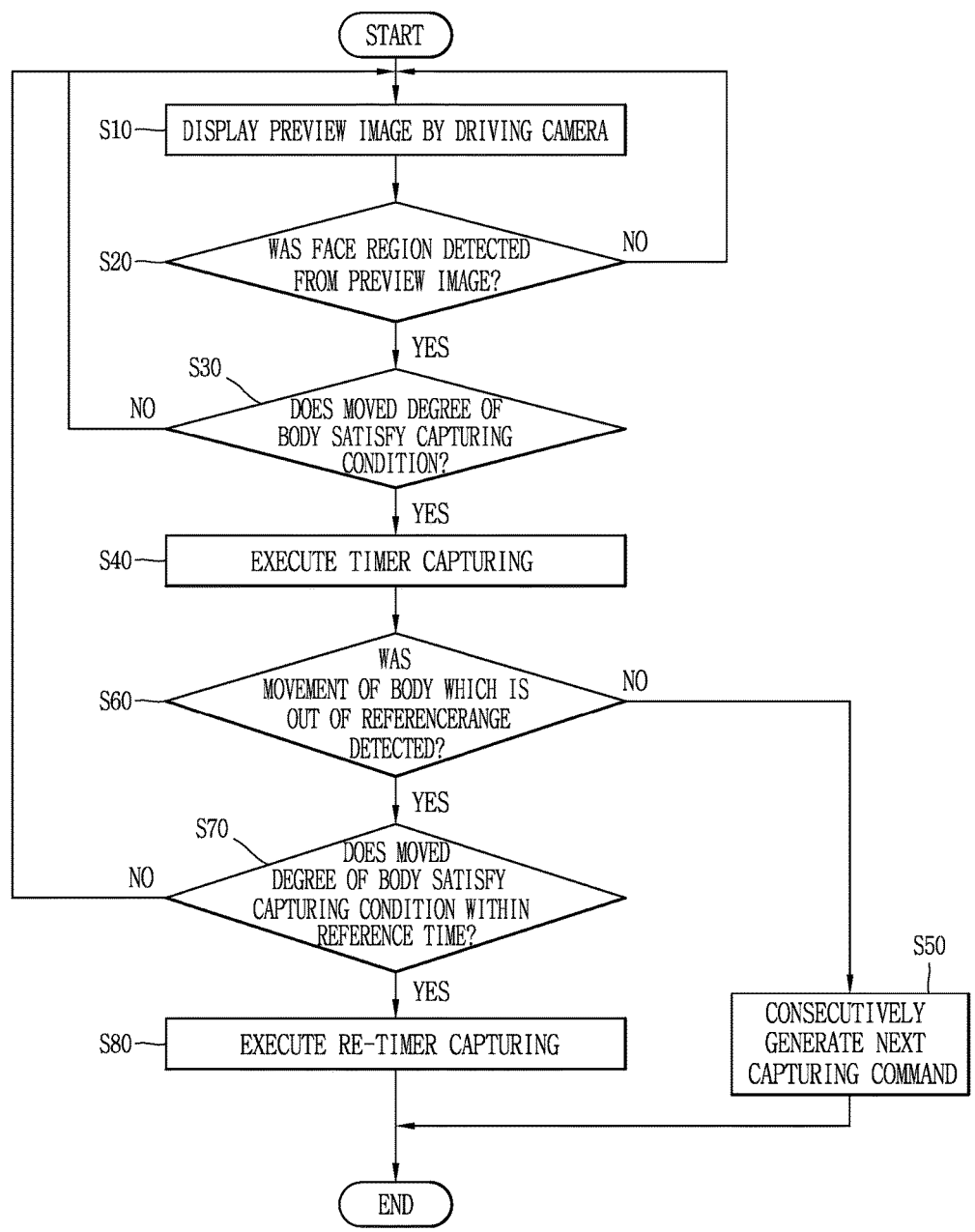

As shown in FIG. 4, the mobile terminal 100 according to an embodiment of the present invention may continuously sense a moved degree of the mobile terminal 100, even during a timer capturing or a consecutive capturing. Thus, it may be determined whether the moved degree of the mobile terminal satisfies a preset capturing condition or is out of a reference range (S60).

If it is determined that the moved degree of the mobile terminal does not satisfy the preset capturing condition or is out of the reference range, a timer capturing or a consecutive capturing is stopped. And it is determined whether the moved degree of the mobile terminal satisfies the preset capturing condition within a reference time (S70).

If it is determined that the moved degree of the mobile terminal satisfies the preset capturing condition within the reference time, a re-timer capturing is executed (S80). The reference time means a threshold value for determination that a user does not have a capturing intention any longer, which may be set or variable by a user input.

Figure 3:
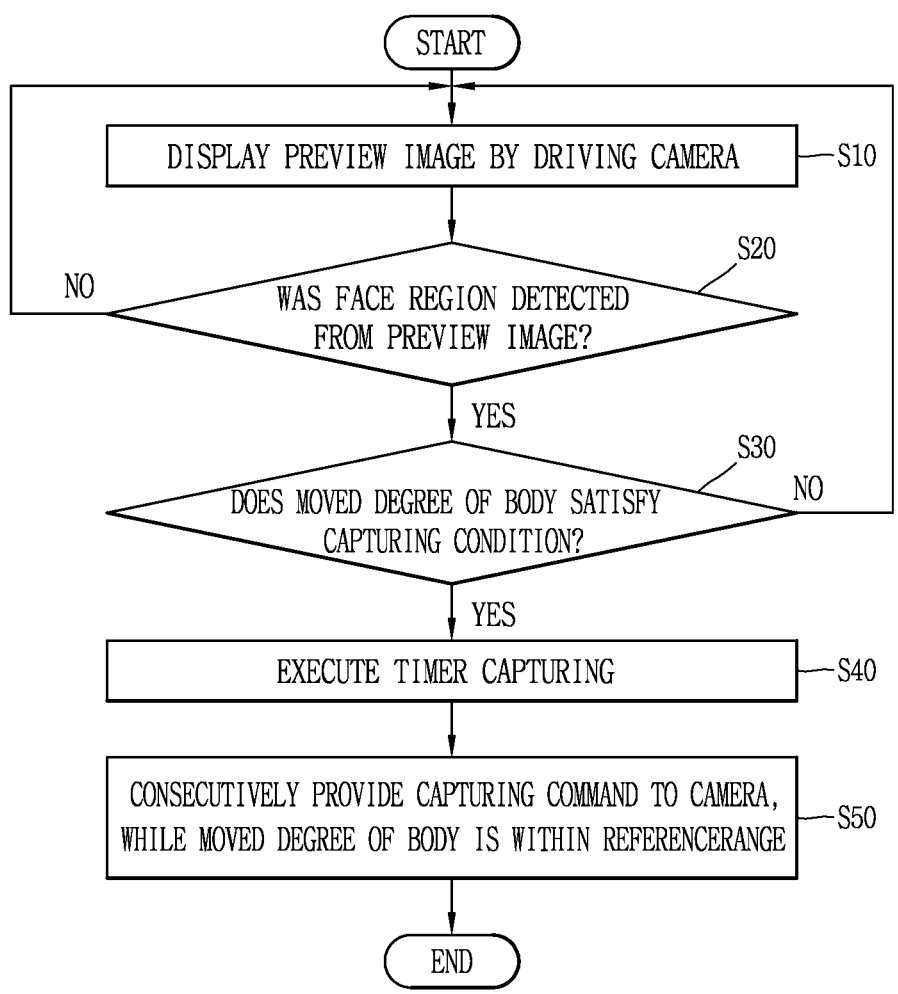
FIGS. 3 and 4 are flowcharts illustrating an operation of a mobile terminal according to an embodiment of the present invention.
Figure 5:
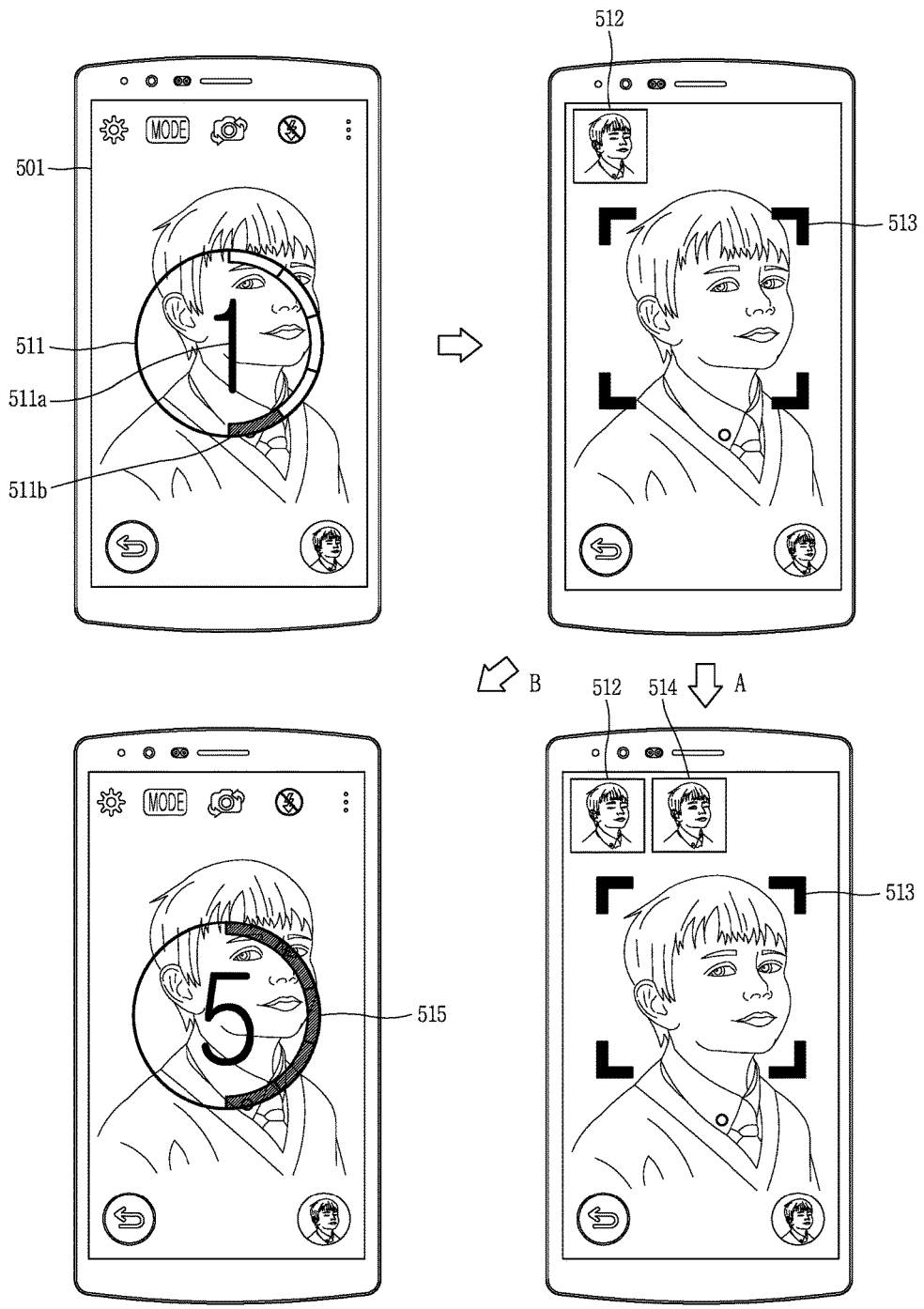
FIGS. 5 and 6 are conceptual views illustrating the flowcharts shown in FIGS. 3 and 4.
Figure 6:
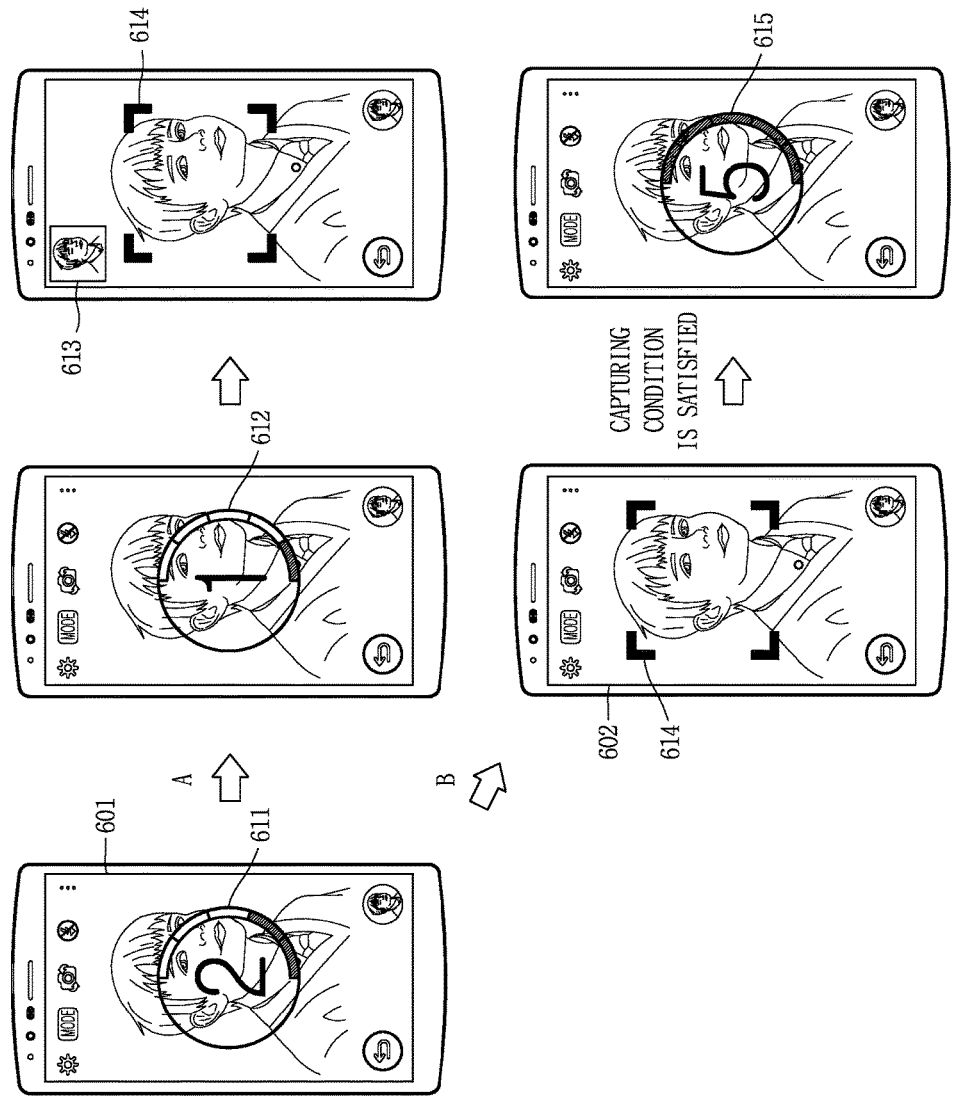

FIGS. 5 and 6 are conceptual views illustrating embodiments related to the aforementioned operations shown in FIGS. 3 and 4.

More specifically, FIG. 5 illustrates different operations executed according to whether a moved degree of the mobile terminal is out of a reference range after the aforementioned timer capturing, and FIG. 6 illustrates different operations executed according to whether a moved degree of the mobile terminal satisfies a capturing condition during the aforementioned timer capturing.

Referring to FIG. 5, if a face region of a subject is detected from a preview screen 501 displayed as the camera is driven, and if a moved degree of the mobile terminal 100 satisfies a capturing condition, a timer capturing is started. Once a timer is operated, time information about remaining time before a capturing operation may be checked on a displayed image 511 through a change of a number 511a and an object 511b. Then, if the shutter of the camera is operated as the timer expires, a captured image is output to the display unit 151 in the form of a thumbnail 512.

The controller 180 continues to detect the face region of the subject after the timer capturing, thereby displaying a corresponding guide object 513 on the preview screen. The guide object 513 is illustrated in the form of a box image. However, the present invention is not limited to this. That is, the guide object 513 may be illustrated as all types of forms (e.g., a circular image, a quadrangular image, a shading effect, etc.) by which the recognized face of the subject can be recognized from other object.

Then, it is determined whether a moved degree of the mobile terminal 100 is out of a reference range. The reference range may correspond to the aforementioned capturing condition (a movement of the body of the mobile terminal 100 has not been sensed), or may mean a range large enough to determine that a moved degree and an angle change amount of the mobile terminal 100 are recognized as a user's consecutive capturing. That is, a more movement of the mobile terminal 100 is allowed than in the aforementioned condition to start a timer capturing.

In FIG. 5, 'B' indicates a case where a moved degree of the mobile terminal 100 is out of a reference range after a timer capturing, and a user makes a capturing composition within a reference time to satisfy a capturing condition. As shown, thumbnails of captured images disappear from the display unit 151, and a timer driving by a re-timer capturing is executed.

In FIG. 5, 'A' indicates a case where the mobile terminal 100 is moved within the reference range after a timer capturing. As shown, if a user executes a consecutive capturing, thumbnails 512, 514 of captured images are displayed in order of capturing, and the guide object 513 is displayed around the detected face region.

While an automatic timer capturing or an automatic consecutive capturing is executed, output of a menu icon for inputting a capturing command from a user, to the preview screen may be restricted. With such a configuration, the display unit has a simple screen, and the user may recognize that the automatic timer capturing or the automatic consecutive capturing is being executed.

If a touch input is applied to the preview screen while the automatic timer capturing or the automatic consecutive capturing is being executed, a menu icon for inputting a capturing command from a user may appear, and the automatic timer capturing or the automatic consecutive capturing may be stopped. With such a configuration, the user may easily convert the automatic timer capturing or the automatic consecutive capturing into a manual capturing at a desired time point.

Although not shown, if the face region of the subject disappears from the preview screen or a new face region is added to the preview screen during the timer capturing or after the timer capturing, the controller 180 may stop the timer capturing or the consecutive capturing. In this case, the controller 180 may control a re-timer capturing to be executed if a movement of the body satisfies a capturing condition. In this case, information inducing the user to make a new capturing composition may be output to the display unit.

In an embodiment, the controller 180 may generate a trigger signal to determine whether a moved degree and an angle change amount of the body satisfy a capturing condition, under an assumption that the body is moved within a specific angle range.

The specific angle range may correspond to an initial gesture input to make a user's capturing intention clear. For instance, if the mobile terminal 100 is a little rotated or shaken right and left or up and down in a gripped state, the trigger signal may be generated. With such a configuration, a user's capturing intention may be determined more precisely. For instance, if a user wishes to use the preview screen displayed by driving of the camera as a mirror, the user does not apply an initial gesture input for generating a trigger signal. As a result, an unintentional capturing of the user may be prevented.

The controller 180 may continuously sense whether a moved degree of the body satisfies a predetermined capturing condition during a timer capturing, by the gyro sensor and the acceleration sensor of the body. That is, if the moved degree of the mobile terminal 100 satisfies the capturing condition, the timer capturing may be started and the timer capturing may be maintained.

Referring to FIG. 6, if a face region of a subject is detected from a preview screen 601 and a moved degree of the mobile terminal 100 satisfies a capturing condition, a timer capturing is started, and an image 611 corresponding to a timer driving is displayed on the preview screen 601.

In FIG. 6, 'B' indicates a case where a moved degree of the body does not satisfy a capturing condition during a timer capturing. As shown, as the timer capturing is cancelled, the image 611 corresponding to the timer driving disappears from the preview screen 601, and a guide object 614 is displayed around the face region. Then, if it is determined that a moved degree of the mobile terminal satisfies the capturing condition, a re-timer capturing is executed.

In this case, FIG. 6 illustrates that the timer driving is re-started from the beginning for the re-timer capturing. However, if the re-timer capturing is executed within a predetermined time after the timer capturing is cancelled, the timer driving may be consecutively executed from a time point when the timer driving has been stopped (e.g., 2 seconds). The predetermined time may be shorter than or the same as a reference time corresponding to the capturing condition, and may be differently set or changeable by a user's input.

In FIG. 6, 'A' indicates a case where a moved degree of the body continuously satisfies a capturing condition during a timer capturing. As shown, if the timer driving is completed (612), the shutter of the camera is operated, and a thumbnail 613 of the captured image is displayed on the preview screen. Then, while the mobile terminal 100 is moved within a reference range, a next capturing command is generated.

As aforementioned, in the mobile terminal according to the present invention, the controller 180 continuously senses a moved degree of the mobile terminal 100 in order to determine whether to execute or cancel a timer capturing, a consecutive capturing, and a re-timer capturing.

Figure 13A:
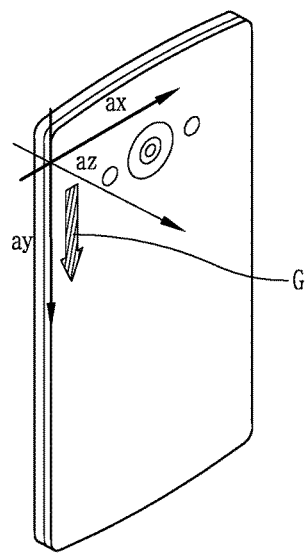
FIGS. 13A and 13B are views illustrating a method of sensing a moved degree of a body using an acceleration sensor and a gyro sensor.
Figure 13B:
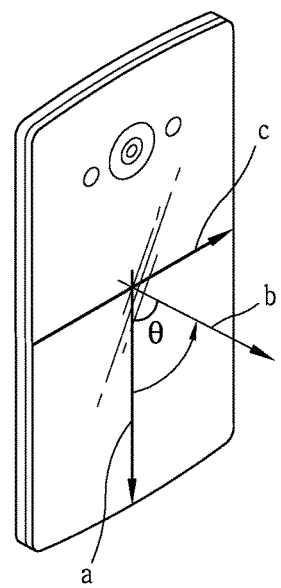

FIGS. 13A and 13B illustrate that a moved degree of the body is sensed by the acceleration sensor and/or the gyro sensor provided at the body. That is, in the present invention, whether the mobile terminal 100 has moved or not may be determined and an angle change amount of the mobile terminal 100 may be calculated, by the acceleration sensor and/or the gyro sensor mounted in the mobile terminal 100.

FIG. 13A illustrates a method of calculating an angle of the mobile terminal 100 based on a ground surface, using the acceleration sensor. More specifically, in FIG. 13A, 'ax' denotes an X-axis value of an acceleration, 'ay' denotes a Y-axis value of an acceleration, 'az' denotes a Z-axis value of an acceleration, and 'G' denotes a gravitational acceleration. The acceleration sensor may sense whether the mobile terminal 100 has moved or not, and a moving speed of the mobile terminal 100.

During or after the timer capturing, the controller 180 may maintain or cancel the timer capturing or a consecutive capturing, based on an angle change amount corresponding to 'ax' ay' and 'az' values by the acceleration sensor. A method of calculating an angle change amount based on 'ax' ay' and 'az' values will be omitted.

If the aforementioned timer capturing and/or a subsequent consecutive capturing is restricted to a horizontal state of the mobile terminal 100, whether the mobile terminal 100 is in a horizontal state or not may be determined by the following formula.

$$(\text{degree})\theta_{ORIE} = a\tan 2(ay, ax)$$

Here, if a condition of $|\theta_{ORIE}| < 10$ is satisfied, it may be determined that the mobile terminal 100 is in a horizontal state.

If the aforementioned timer capturing and/or a subsequent consecutive capturing is restricted to a case where a specific tilted angle is satisfied, the specific tilted angle may be calculated by the following formula.

$$(\text{degree})\theta_{TILT} = \operatorname{asin}\left(\sqrt{\frac{x^2 + y^2}{x^2 + y^2 + z^2}}\right)$$

The specific tilted angle may be more than 80° and less than 170° (80°<$\Theta_{TILT}$<170°).

FIG. 13B illustrates a method of calculating a relative angle (angle change amount) due to a movement of the mobile terminal 100, using the gyro sensor. The relative angle may be calculated by integrating gyro sensing values with each other from an arbitrary time point to a specific time point, using the gyro sensor.

In FIG. 13B, 'a' denotes an angle (0°) of the mobile terminal 100 at an arbitrary time point (reference time point), 'b' denotes a relative angle of the mobile terminal 100 at a specific time point, and 'c' denotes a rotation shaft. A method of calculating a relative angle of the mobile terminal 100 using integrated gyro sensing values will be omitted.

The controller 180 may determine whether to cancel a timer capturing or a consecutive capturing, based on a calculated angle change amount. For instance, if a calculated angle change amount is less than 1~2°, the controller 180 may continuously maintain a timer capturing by determining that a capturing condition (no movement of the mobile terminal 100) has been satisfied. As another example, if a calculated angle change amount is 3°, the controller 180 may cancel the timer capturing if the timer capturing is being executed, and may maintain a consecutive capturing if the timer capturing has been executed.

A relative angle of the mobile terminal at an arbitrary time point based on the rotation shaft may be calculated by the following formula.

$$\theta_x = \int_{t_o}^{t} \omega_x(t) dt$$

Here, $\theta_x$ denotes a relative angle, $\omega_x(t)$ denotes an angular speed of the rotation shaft obtained by the gyro sensor, $t_o$ denotes an arbitrary time point (reference time point), and t denotes a specific time point after the arbitrary time point.

If a change amount measured by the acceleration sensor and/or the gyro sensor is larger than a specific value, the controller 180 may determine that the mobile terminal 100 has moved. That is, if the following formula is satisfied, it may be determined that a capturing condition to start and maintain a timer capturing has been satisfied.

$$|a(t) - a(t-T)| < A$$

Here, a(t) denotes a sensing value by the acceleration sensor or the gyro sensor at an arbitrary time 't', a(t−T) denotes a sensing value before a time 'T' from the time T, and A denotes a threshold value of a sensor displacement. 'T' and 'A' are predetermined constant values. For instance, in case of using the acceleration sensor, 'A' may be 0.1 m/s² and 'T' may be 0.2 s.

As another example, the controller 180 may determine whether the mobile terminal 100 has moved or not, based on a deviation of a sensing value by the acceleration sensor and/or the gyro sensor.

That is, in a case where there are 'n' sensing values before the time 'T' from the arbitrary time 't', if the following formula is satisfied, it may be determined that a capturing condition to start and maintain a timer capturing has been satisfied.

$$\sqrt{\frac{\sum_{i=1}^{n}(a_i - \bar{a})^2}{n}} < B$$

Here, $\bar{a}$ is an average value of 'n' sensing values, B is a threshold value of a sensor deviation, and T and B correspond to preset constant values. For instance, in case of using the gyro sensor, 'T' may be 0.4 s and 'B' may be 0.2.

The mobile terminal 100 according to the present invention may be further provided with a distance measuring sensor therein. In case of capturing a subject using the camera 121b formed on a rear surface of the mobile terminal 100, a distance between the display unit 151 and the subject within a reference distance may be a condition for a timer capturing. That is, the aforementioned condition to detect a face region for a timer capturing may be changed into or replaced by the above condition.

Once a timer capturing or a consecutive capturing is converted into a capturing mode by a user's input, etc., the gyro sensor and the acceleration sensor to sense whether the mobile terminal 100 has moved or not and to sense an angle change of the mobile terminal 100 may be automatically converted into an inactivated state.

Figure 7A:
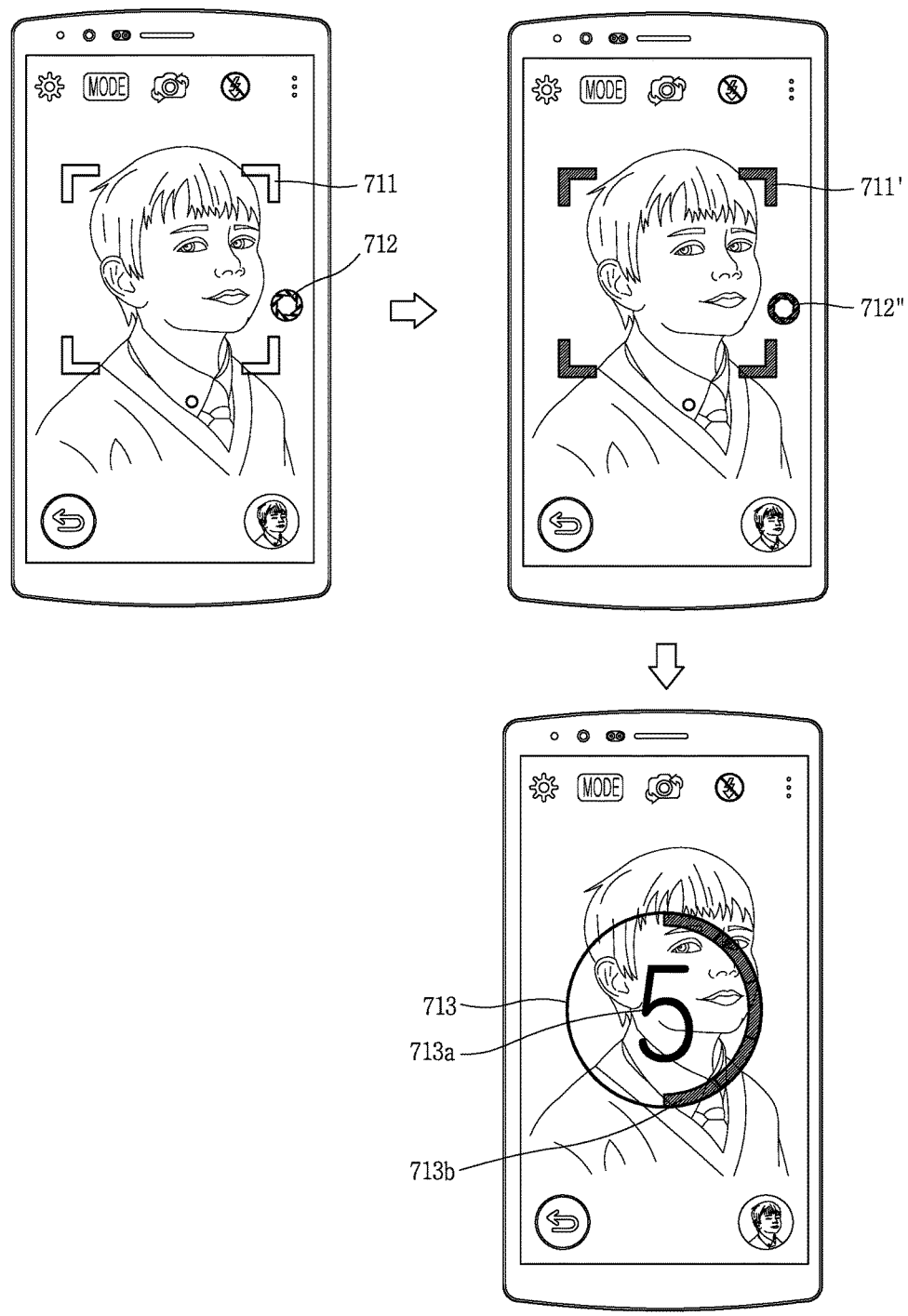
FIGS. 7A to 7C are views illustrating timer capturing-related graphic objects output to a preview screen.
Figure 7B:
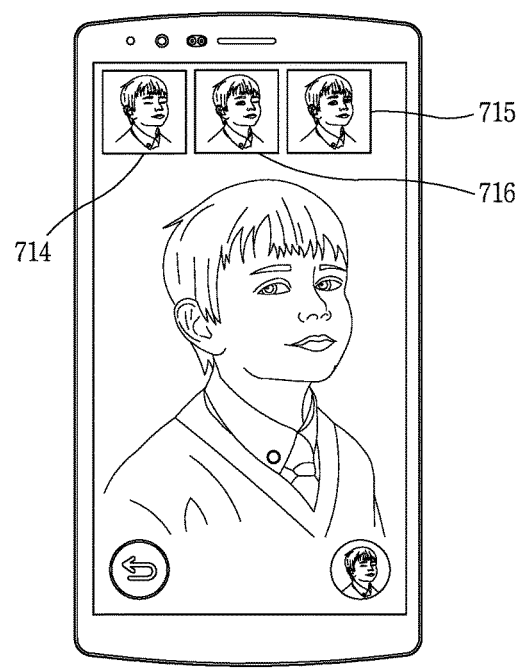
Figure 7C:
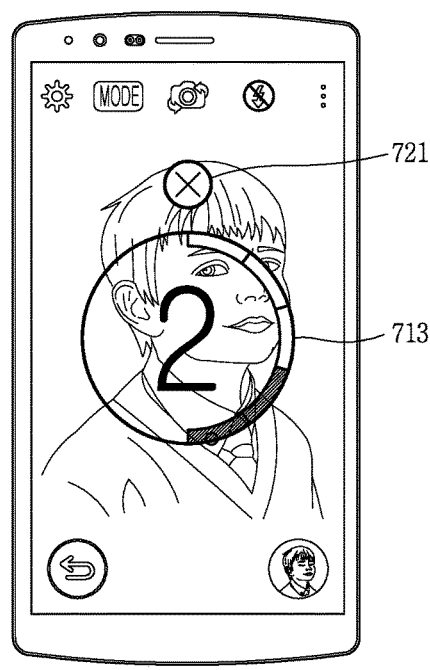

FIGS. 7A to 7C illustrate examples of various graphic objects output to a preview screen in relation to a timer capturing, according to an embodiment of the present invention.

During the aforementioned timer capturing or the consecutive capturing, or after the timer capturing, the controller 180 may restrict output of a menu icon for inputting a capturing command to a preview screen, while a moved degree of the mobile terminal 100 satisfies a reference range. Thus, a user may recognize that an automatic capturing of the mobile terminal 100 is being executed.

For instance, referring to FIG. 7A, if a face region is detected from a preview image and a first guide object 711 is output around the face region, the controller 180 may display a second guide object 712 indicating execution of a timer capturing, on a preview screen in a deactivated state.

As shown, the second guide object 712 is displayed near the detected face region, in the form of an image similar to an aperture of the camera. However, the present invention is not limited to this. For instance, the second guide object 712 may be displayed on an upper end or a lower end of the display unit 151.

The second guide object 712 may be converted into an activated state, if a moved degree of the body satisfies a capturing condition (i.e., the mobile terminal has been fixed for a predetermined time without being moved). For instance, the second guide object 712 displayed in white as a 2D image may be displayed in black as a 3D image (712"). This may allows a user to recognize that a timer capturing will be started soon. An image 713 indicating remaining time corresponding to a timer driving is popped-up on the display unit 151 (713). If a moved degree of the mobile terminal 100 is out of a capturing condition during the timer capturing, the aforementioned second guide object 712 is converted into a deactivated state.

As another embodiment, referring to FIG. 7C, an icon 721 for turning on or off a function corresponding to a timer capturing during a timer driving may be output to the preview screen.

If a touch input is applied to the icon 721, the controller 180 may turn off the function corresponding to a timer capturing. Thus, even if a moved degree of the mobile terminal 100 satisfies a capturing condition, a timer capturing is not executed. Rather, a menu icon for inputting a capturing signal is displayed on the preview screen. The icon 721 may be converted into an icon for converting the function corresponding to a timer capturing into an 'ON' state. In this case, the converted icon may be displayed on a different position from the previous position.

Referring to FIG. 7B, as aforementioned, thumbnail images 714, 715, 716 may be displayed on an upper end or a lower end of the display unit 151, such that images captured during a timer capturing and a subsequent consecutive capturing may be viewed on a single screen. In this case, since the number of the displayed thumbnails is limited, the thumbnail images may be displayed in an overlapped manner. Alternatively, the firstly-displayed thumbnail image may disappear sequentially in a queue manner.

In another embodiment, if a touch input is applied to the displayed thumbnail images 714, 715, 716 after the timer capturing and the consecutive capturing, edition of stored images such as deletion and integration may be executed on a single screen.

Figure 8:
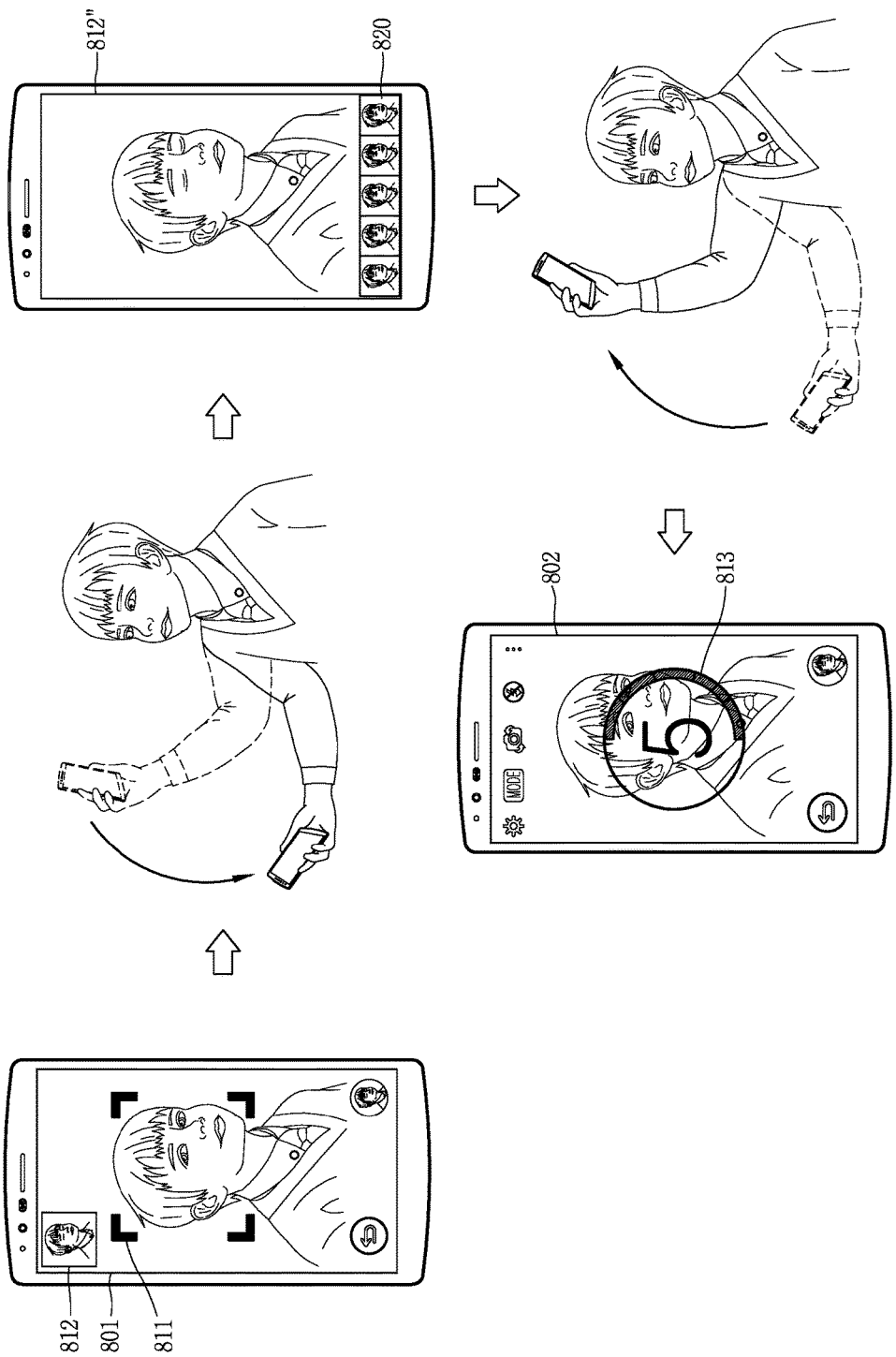
FIG. 8 is a view illustrating a method of checking a captured image according to an embodiment of the present invention.

FIG. 8 illustrates examples to rapidly check a captured image according to an embodiment of the present invention.

As aforementioned with reference to FIG. 7B, a user may check a captured image through thumbnail images. However, it is difficult to check a small change of a subject such as a facial expression, due to a size of the thumbnail image. Further, the user may determine whether to execute a next capturing, after viewing the captured image.

If the body has been downward moved by more than a reference distance after a timer capturing or a next capturing by a next capturing command, the controller 180 may execute a quick view mode for viewing the captured image. Whether the body has been downward moved by more than the reference distance may be sensed based on an X-axis value and a Y-axis value of the acceleration sensor, and/or sensing values sensed by the gyro sensor.

In the quick view mode, the controller 180 converts a displayed preview screen into an image captured immediately before the quick view mode is executed.

For instance, referring to FIG. 8, in a standby state for a next capturing after a thumbnail image 812 of an image captured during a timer capturing has been output to a preview screen 801, if the mobile terminal 100 is downward much rotated like a gesture to view the captured image, a quick view mode is executed. Thus, the thumbnail image 812 is output to an entire region of the display unit 151. In case of a consecutive capturing after the timer capturing, if there are images which have been captured previously, the images may be displayed on a lower end of the display unit 151 in the form of thumbnail images (820).

In the quick view mode, if the mobile terminal 100 is upward much rotated by more than a reference distance like a gesture to attempt re-capturing, the quick view mode is terminated, and the controller 180 is ready to start a timer capturing. That is, the controller 180 re-outputs the preview screen to the display unit 151, and detects a face region of a subject. Then, if a moved degree of the mobile terminal 100 satisfies a predetermined capturing condition, the timer capturing is re-executed.

In the mobile terminal 100, a capturing time point may be determined without an additional input for capturing, and no input is required when a user resumes capturing after viewing a captured image on a large screen. That is, in the mobile terminal 100, a user's intention to capture an image, a user's intention to view a captured image, and a user's intention to resume capturing are determined merely based on a movement of the mobile terminal 100, and a corresponding operation is executed.

The aforementioned quick view mode may be restricted to be executed after a timer capturing or during a consecutive capturing. That is, if the mobile terminal 100 is downward much rotated during a timer capturing, other operation (e.g., termination of a function corresponding to the timer capturing, and conversion into a manual capturing mode) may be executed.

Figure 9B:
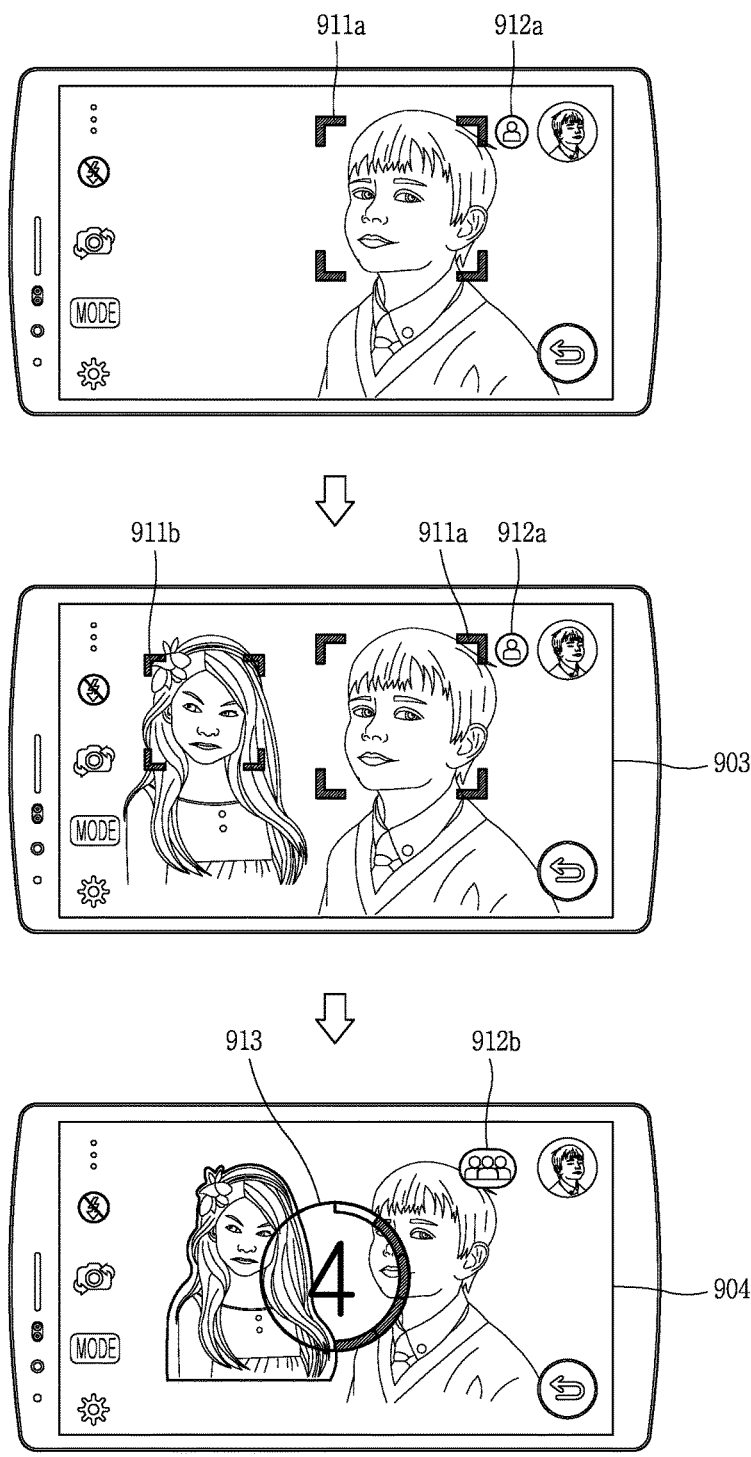

FIGS. 9A and 9B illustrate a method of converting a current mode into a general angle mode or a wide angle mode during a timer capturing or a consecutive capturing, in a case where the mobile terminal 100 is provided with a plurality of cameras including a general lens and a wide angle lens.

For this, the mobile terminal 100 according to an embodiment of the present invention may further include a first camera 121a having a general lens on the front surface of the body, and a second camera 121c having a wide angle lens for supporting a wide viewing angle. According to a control signal received from the controller 180, capturing may be executed by using the first camera 121a in a general angle mode, and capturing may be executed by using the second camera 121c in a wide angle mode. An image captured by the second camera 121c includes a larger number of subjects than an image captured by the first camera 121a.

In an embodiment, the controller 180 may detect a display direction of the display unit 151 by the sensing unit 140 of the mobile terminal 100, e.g., based on an X-axis sensing value by the acceleration sensor, etc. Then, the controller 180 may determine an operation mode corresponding to the detected display direction. If the display unit 151 is in a vertical mode as a result of the determination, the controller 180 activates the first camera 121a (refer to FIG. 1B). On the other hand, if the display unit 151 is in a horizontal mode as a result of the determination, the controller 180 activates the second camera 121c (refer to FIG. 1B) to output a corresponding second preview image.

For instance, referring to FIG. 9A, if a display direction of the display unit 151 is converted into a horizontal mode from a vertical mode during the aforementioned consecutive capturing, the controller 180 may execute the consecutive capturing by converting a general angle mode into a wide angle mode. Accordingly, in the horizontal mode, a larger number of subjects may be included in a preview screen 901, and a face region may look smaller than a face region 911 in the vertical mode. On the other hand, if a display direction of the display unit 151 is converted into a vertical mode from a horizontal mode, the controller 180 may execute the consecutive capturing by converting a wide angle mode into a general angle mode.

When a general angle mode is converted into a wide angle mode, a first graphic object 912a indicating a general angle mode may be converted into a second graphic object 912b indicating a wide angle mode.

If a display direction of the display unit 151 is changed during a timer capturing or a consecutive capturing, a moved degree of the mobile terminal 100 may not satisfy a capturing condition or may be out of a reference range. In this specification, even if a moved degree of the mobile terminal 100 does not satisfy a capturing condition or is out of a reference range, if a display direction of the display unit 151 is changed, a timer capturing or a consecutive capturing may be continuously executed without being stopped.

As another example, although not shown, if a motion to shake the body within a reference range is detected during a timer capturing or while a next capturing command for a consecutive capturing is being executed, the controller 180 may convert a camera driving from the first camera 121a to the second camera 121c, or may convert a camera driving from the second camera 121c to the first camera 121a.

The reference range means a range large enough to determine that a moved degree and an angle change amount of the mobile terminal 100 are recognized as a user's consecutive capturing intention. For instance, the reference range may be a movement corresponding to a user's motion to move the mobile terminal 100 right and left with gripping the mobile terminal 100.

If such a user's motion is detected during a timer driving, the controller 180 may convert a camera driving and may cancel the timer capturing.

As another example, referring to FIG. 9B, if a new face region 911b is detected from a preview screen while the controller 180 is preparing for a timer capturing in a general angle mode or during a consecutive capturing, the controller 180 may convert the general angle mode into a wide angle mode to execute the timer capturing or the consecutive capturing. In this case, a first icon 912a indicating a general angle mode may be changed into a second icon 912b indicating a wide angle mode, and an image 913 corresponding to a timer driving may be output.

The position of a new face region 911b for converting a general angle mode into a wide angle mode may be restricted. That is, if a new face region is detected from a boundary region of the preview screen (variable), the controller 180 may convert a general angle mode into a wide angle mode. On the other hand, if a new face region is detected from part rather than the boundary region, the controller 180 may execute a re-timer capturing or a consecutive capturing within maintaining a general angle mode.

If a new face region is detected or the existing face region disappears during a timer driving, the timer driving may be stopped, and then a re-timer capturing may be executed when a capturing condition is satisfied. In this case, conversion into a general angle mode and a wide angle mode may be executed independently.

In the aforementioned embodiment, if other condition is changed after a user has made a capturing composition or a capturing pose, an operation corresponding to the changed condition may be independently executed from a timer capturing or a consecutive capturing. Thus, a user may obtain an image with a desired capturing composition.

Figure 11:
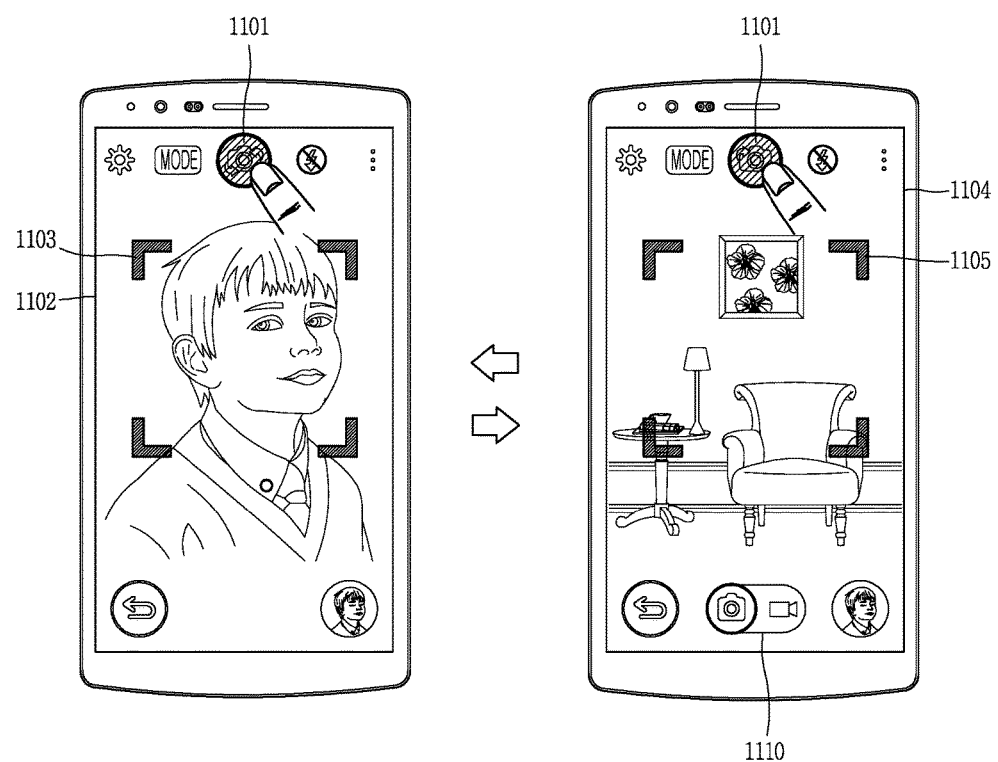

FIGS. 10 and 11 illustrate that a timer capturing is activated or deactivated according to a capturing mode corresponding to a camera driving, in a case where the mobile terminal 100 of the present invention is provided with a rear camera.

Referring to FIG. 10, when a camera application is executed on the mobile terminal 100 (S100), the controller 180 may determine whether the driven camera is the front camera 121a (or 121c) formed on the front surface of the body or the rear camera 121b formed on the rear surface of the body.

If the front camera 121a (or 121c) has been driven (S200), a face region of a subject is detected from a first preview screen corresponding to the front camera, and a timer capturing is executed based on a moved degree of the mobile terminal 100. That is, in a self capturing mode, a timer capturing is started only when a moved degree of the body based on sensing values by the aforementioned sensors satisfies a capturing condition.

On the other hand, if the rear camera 121b has been driven (S400), it is determined whether the rear camera 121b has been driven during a timer capturing (S500). For instance, conversion to the rear camera 121b may be executed without a motion of the mobile terminal 100, as a user applies a touch input to a camera conversion icon among option icons output to a preview screen.

If the rear camera 121b has been driven during a timer capturing, the timer capturing may be stopped (S600), and a menu icon for inputting a capturing command may be output to a region of the preview screen which corresponds to the driving of the rear camera 121b (S700).

For instance, referring to FIG. 11, when a touch input is applied to a camera conversion icon 1101, a self capturing mode may be converted into a background capturing mode or vice versa. If the front camera 121a is driven as the background capturing mode is converted into the self capturing mode, sensors for sensing a moved degree of the mobile terminal 100 may be activated.

Although not shown, in a case where both of the front camera 121a and the rear camera 121b are driven in a dual capturing mode, the display unit 151 may display both a first preview screen for a self capturing and a second preview screen for a background capturing.

In this case, if a face region of a subject is detected from the first preview screen and a capturing condition that a movement of the body is not sensed for a reference time is satisfied, a timer capturing for capturing both the first preview screen and the second preview screen may be executed.

So far, have been explained embodiments to execute a timer capturing or a consecutive capturing when the front camera is driven or when both the front camera and the rear camera are driven.

Hereinafter, an embodiment to execute the aforementioned timer capturing and the consecutive capturing when the rear camera is used and when a subject is an object not a man, will be explained with reference to FIG. 12.

Referring to FIG. 12, when a specific object image 10" (e.g., a tree) is selected from a preview screen 1201 displayed as the rear camera 121b (refer to FIG. 1B) is driven, the controller 180 may start a timer capturing based on a distance (A) between the display unit 151 and an object 10. The object 10 may be selected by a touch input applied to the preview screen 1201.

It is assumed that the mobile terminal 100 of the present invention is provided with a distance measuring sensor. That is, a timer capturing and a consecutive capturing are executed when a change range of a sensing value or sensing values measured by the distance measuring sensor is smaller than a preset maximum distance value.

If the distance (A) between the display unit 151 and the object 10 is smaller than an allowable maximum distance value and the object image 10" is output within the display unit 151 (a), a timer capturing is automatically started without an additional input (1211). On the other hand, if the distance (A) between the display unit 151 and the object 10 is larger than or equal to the allowable maximum distance value, or if at least part of the object image 10" is out of the display unit 151 (b), a menu icon 1213 for inputting a capturing command is output and a timer capturing is not executed. Although not shown, in this case, a moving direction of the mobile terminal 100 for inducing the object image 10" to be within the display unit 151 may be displayed on the preview screen (e.g., an arrow image, etc.).

As another embodiment, if a specific object is selected from a preview screen displayed as the rear camera 121b (refer to FIG. 1B) is driven, and if a movement of the selected specific object and the body is not detected, a timer capturing with respect to the preview screen may be executed. With such a configuration, the timer capturing may be executed without an additional input, and a clear subject image in a non-blurred state may be obtained as a capturing time point is determined when the specific object is not moved.

In the aforementioned embodiments, a timer capturing may be executed even when only the rear camera is driven, or when a subject is not a man. This may allow even a user not accustomed to using the camera, to precisely determine a time point to capture a subject.

In another embodiment, the controller 180 may display an indication indicating that the aforementioned capturing condition has been satisfied, on the preview screen. Alternatively, the controller 180 may output a sound through the audio output unit 152, etc., before a timer capturing.

Further, the controller 180 may restrict the aforementioned timer capturing not only to a case where a capturing condition (i.e., the body of the mobile terminal should not be moved for a predetermined time) is satisfied, but also to a case where a facial expression change is not great or a face position is not changed on a detected face region. In this case, during a consecutive capturing after the timer capturing, the restriction of a facial expression change or a position change may be released.

The controller 180 may recognize a capturing command by other type of preset input method even during the timer capturing. For instance, the timer capturing may be cancelled even when the mobile terminal 100 is in a fixed state, if a user has uttered 'stop' and a voice input to a user interface (UI) related to the timer capturing is allowed during a timer driving.

The controller 180 may differently determine a time interval of a consecutive capturing after the timer capturing, based on other condition rather than a reference time interval. For instance, the controller 180 may reduce or increase a time interval of a consecutive capturing, based on an angle change amount of the mobile terminal 100. As another example, the controller 180 may control a consecutive capturing to be executed whenever an angle change of the mobile terminal 100 is sensed.

The controller 180 may execute a consecutive capturing rather than a timer capturing from the beginning, based on a user's input or setting information.

For prevention of a user's unintentional capturing, the controller 180 may set a camera fixing time corresponding to a capturing condition to start a timer capturing to be long, or may control a timer capturing not to be executed when a specific facial expression (e.g., a facial expression to open the mouth, or a facial expression to contact a specific part to a camera lens) is detected.

The mobile terminal according to the present invention may have the following advantages.

Firstly, since a timer capturing is started by a user's capturing intention without an additional input, a user's inconvenience to apply an input for the timer capturing or a consecutive capturing may be solved.

Secondly, a user may execute a timer capturing and a consecutive capturing by determining a capturing time point, by applying a touch input or by making a capturing composition or a capturing pose. Then, the user may view a captured image on a large screen, and then may continuously execute the capturing. That is, in the mobile terminal of the present invention, a user's intention to capture an image, a user's intention to view a captured image, and a user's intention to resume capturing are determined merely based on a movement of the body, and a corresponding operation is executed. This may allow the user to obtain an image without a movement of a capturing composition.

Further, a motionless moment of a subject is set as one of capturing conditions, and a time point to capture the subject is determined in a fixed state of the subject. This may allow even a user not accustomed to using a camera to obtain a motionless image.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a body;
a first camera configured to capture images;
a display configured to display a preview screen captured by the first camera;
a sensor configured to sense movement of the body; and
a controller configured to:
execute a timed image capture operation when a first face is detected in the preview screen and a degree of movement sensed via the sensor satisfies a preset capturing condition; and
execute a consecutive image capturing operation while movement of the body is within a reference range after an image is captured via the timed image capture operation,
wherein in the consecutive image capturing operation, the controller is further configured to:
determine a next capturing time point when another movement of the body is sensed within the reference range, and
maintain a capturing standby state while no movement of the body is sensed.

2. The mobile terminal of claim 1, wherein:
the sensor is further configured to sense a change in a position angle of the body; and
the controller is further configured to execute the timed image capture operation when the face is included in the displayed preview screen and no change in movement or position angle of the body is sensed for a threshold length of time.

3. The mobile terminal of claim 2, wherein the controller is further configured to determine whether a change in movement or position angle of the body has not been sensed for a threshold length of time when a position angle of the body is within a specific angle range.

4. The mobile terminal of claim 1, wherein the controller is further configured to cancel the timed image capture operation when the degree of movement does not satisfy the preset capturing condition during the timed image capture operation.

5. The mobile terminal of claim 4, wherein the controller is further configured to re-execute the timed capture operation when the degree of movement satisfies the preset capturing condition within a threshold length of time after cancellation.

6. The mobile terminal of claim 1, wherein the controller is further configured to cause the display to no longer display a menu icon for inputting a capturing command to the preview screen while the degree of movement satisfies the preset capturing condition.

7. The mobile terminal of claim 1, wherein the controller is further configured to:
cancel the timed image capture operation when the movement of the body is no longer within the reference range after the image is captured via the timed image capture operation; and
re-execute the timed image capture operation when the degree of movement satisfies the preset capturing condition within a threshold length of time after cancellation.

8. The mobile terminal of claim 1, wherein the controller is further configured to cancel the timed image capture operation when a second face is detected in the preview screen or the first face is no longer detected in the preview screen during the timed image capture operation.

9. The mobile terminal of claim 1, wherein the controller is further configured to cause the display to display at least a first image corresponding to the timed image capturing operation or a second image corresponding to the consecutive image capturing operation on the preview screen in the form of a thumbnail image.

10. The mobile terminal of claim 1, wherein the controller is further configured to:
cause the display to display guide information indicating execution of the timed image capturing operation on the preview screen in a first image when the first face is detected in the preview screen; and
convert the first image into a second image when the degree of movement satisfies the preset capturing condition.

11. The mobile terminal of claim 1, wherein the controller is further configured to cause the display to display on the preview screen a graphic object for turning on or off a function corresponding to the time image capture operation based on a touch input.

12. The mobile terminal of claim 1, wherein the controller is further configured to:
execute a quick view mode when the body is moved downwardly by more than a reference distance after one or more images are captured via the timed image capture operation or the consecutive image capturing operation; and
cause the display to cease displaying the preview screen and to display the one or more captured images when the quick view mode is executed.

13. The mobile terminal of claim 12, wherein the controller is further configured to terminate the quick view mode and cause the display to re-display the preview screen when the body is moved upwardly by more than the reference distance in the quick view mode.

14. The mobile terminal of claim 1, further comprising a second camera having a wider viewing angle than the first camera;
    wherein the controller is further configured to activate the first camera when a display direction of the display sensed by the sensor is in a vertical mode; and
    activate the second camera when the display direction of the display sensed by the sensor is in a horizontal mode.

15. The mobile terminal of claim 14, wherein the controller is further configured to cause the display to display a second preview screen when a movement of the body within the reference range is sensed during the timed image capturing operation or during a consecutive image capturing operation.

16. A mobile terminal, comprising:
    a body;
    a front camera disposed on a front side of the body;
    a rear camera disposed on a rear side of the body;
    a sensor configured to sense movement of the body;
    a display configured to display preview information corresponding to the front camera or the rear camera; and
    a controller configured to:
    cause the display to display a first preview screen corresponding to the front camera when the front camera is activated and execute a timed image capturing operation when a degree of movement of the body satisfies a preset capturing condition and a face is detected in the first preview screen; and
    cause the display to display a second preview screen corresponding to the rear camera when the rear camera is activated, wherein the second preview screen comprises a menu icon for receiving a capturing command;
    terminate the timed image capturing operation when the rear camera is activated during the timed image capturing operation; and
    activate the sensor for sensing movement of the body when the front camera is activated while the second preview screen is displayed.

17. The mobile terminal of claim 16, wherein the controller is further configured to cause the display to display both the first preview screen and the second preview screen when both the front camera and the rear camera are activated.

18. The mobile terminal of claim 16, wherein the controller is further configured to execute the timed image capturing operation based on the second preview screen when a specific object is selected from the second preview screen and no movement of the selected specific object and the body is detected for a threshold length of time.

\* \* \* \* \*